(12) United States Patent
Xiao et al.

(10) Patent No.: US 12,289,201 B2
(45) Date of Patent: **\*Apr. 29, 2025**

(54) CONDITIONAL INHERITANCE IN MANAGEMENT FRAME FOR MULTI-LINK AGGREGATION

(71) Applicant: QUALCOMM Incorporated, San Diego, CA (US)

(72) Inventors: Yongchun Xiao, San Jose, CA (US); Abhishek Pramod Patil, San Diego, CA (US); Sandip HomChaudhuri, San Jose, CA (US); Ravi Gidvani, Fremont, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 17/735,067

(22) Filed: May 2, 2022

(65) Prior Publication Data

US 2022/0329482 A1 Oct. 13, 2022

Related U.S. Application Data

(63) Continuation of application No. 16/288,037, filed on Feb. 27, 2019, now Pat. No. 11,329,871.

(Continued)

(51) Int. Cl.
*H04L 41/0806* (2022.01)
*H04L 12/28* (2006.01)
(Continued)

(52) U.S. Cl.
CPC ...... *H04L 41/0806* (2013.01); *H04L 12/2801* (2013.01); *H04L 45/245* (2013.01);
(Continued)

(58) Field of Classification Search
None
See application file for complete search history.

(56) References Cited

U.S. PATENT DOCUMENTS

| 8,885,539 B2 | 11/2014 | Trudeau et al. |
| 9,794,829 B2 | 10/2017 | Seok |

(Continued)

FOREIGN PATENT DOCUMENTS

| CN | 103907388 A | 7/2014 |
| CN | 104602266 A | 5/2015 |

(Continued)

OTHER PUBLICATIONS

European Search Report—EP23176936—Search Authority—The Hague—Oct. 4, 2023.

(Continued)

*Primary Examiner* — Faruk Hamza
*Assistant Examiner* — Cassandra L Decker
(74) *Attorney, Agent, or Firm* — Holland & Hart LLP/Qualcomm

(57) ABSTRACT

This disclosure provides systems, methods, and apparatus, including computer programs encoded on computer storage media, for implementing multi-link aggregation and conditional inheritance in a first basic service set (BSS). In one aspect, an apparatus may establish a first communication link with a first station (STA) of the first BSS using a first frequency band. The apparatus may determine a first link profile for a second communication link by customizing one or more management elements of management information associated with the first communication link. The apparatus may configure a first non-inheritance element of the first link profile associated with the second communication link to indicate usage of at least one management element of the management information by the second communication link (Continued)

is disabled. The apparatus may generate a management frame that comprises at least the first link profile, and may output the management frame for transmission.

30 Claims, 15 Drawing Sheets

Related U.S. Application Data

(60) Provisional application No. 62/685,904, filed on Jun. 15, 2018, provisional application No. 62/636,287, filed on Feb. 28, 2018.

(51) Int. Cl.
| | | |
|---|---|---|
| *H04L 45/24* | (2022.01) | |
| *H04W 24/02* | (2009.01) | |
| *H04W 28/06* | (2009.01) | |
| *H04W 40/24* | (2009.01) | |
| *H04W 48/12* | (2009.01) | |
| *H04W 48/16* | (2009.01) | |
| *H04W 72/0453* | (2023.01) | |
| *H04W 74/00* | (2009.01) | |
| *H04W 76/15* | (2018.01) | |
| *H04W 84/12* | (2009.01) | |
| *H04W 88/08* | (2009.01) | |
| *H04W 88/16* | (2009.01) | |

(52) U.S. Cl.
CPC ......... *H04W 24/02* (2013.01); *H04W 40/244* (2013.01); *H04W 48/12* (2013.01); *H04W 48/16* (2013.01); *H04W 72/0453* (2013.01); *H04W 74/006* (2013.01); *H04W 76/15* (2018.02); *H04W 88/08* (2013.01); *H04W 28/06* (2013.01); *H04W 84/12* (2013.01); *H04W 88/16* (2013.01)

(56) References Cited

U.S. PATENT DOCUMENTS

| | | | |
|---|---|---|---|
| 9,847,988 | B2 | 12/2017 | Chu et al. |
| 10,588,165 | B1 | 3/2020 | Chu et al. |
| 10,938,644 | B2 | 3/2021 | Xiao et al. |
| 11,329,871 | B2 | 5/2022 | Xiao et al. |
| 2008/0069006 | A1 | 3/2008 | Walter et al. |
| 2010/0020746 | A1 | 1/2010 | Zaks |
| 2013/0044735 | A1 | 2/2013 | Lee et al. |
| 2013/0077554 | A1 | 3/2013 | Gauvreau et al. |
| 2014/0064257 | A1 | 3/2014 | Fontaine et al. |
| 2016/0006672 | A1 | 1/2016 | Saavedra |
| 2017/0071022 | A1 | 3/2017 | Sampath et al. |
| 2017/0257817 | A1 | 9/2017 | Itagaki et al. |
| 2017/0359300 | A1 | 12/2017 | Patil et al. |
| 2018/0054724 | A1 | 2/2018 | Cariou et al. |
| 2018/0054847 | A1 | 2/2018 | Cariou et al. |
| 2018/0199271 | A1 | 7/2018 | Viger et al. |
| 2018/0295567 | A1 | 10/2018 | Ko et al. |
| 2019/0268221 | A1 | 8/2019 | Xiao et al. |
| 2019/0268956 | A1 | 8/2019 | Xiao et al. |
| 2020/0252874 | A1 | 8/2020 | Atefi |
| 2020/0413343 | A1 | 12/2020 | Atefi |
| 2021/0204324 | A1* | 7/2021 | Viger ................ H04W 72/0446 |
| 2021/0337475 | A1* | 10/2021 | Cariou ................ H04L 5/0098 |

FOREIGN PATENT DOCUMENTS

| | | |
|---|---|---|
| CN | 103096328 B | 9/2015 |
| CN | 105165072 A | 12/2015 |
| CN | 111788849 B | 4/2022 |
| EP | 3367743 A1 | 8/2018 |
| GB | 2548155 | 9/2017 |
| TW | M323766 U | 12/2007 |
| WO | WO-2016123473 A1 | 8/2016 |
| WO | WO-2017044456 A1 | 3/2017 |
| WO | WO-2017069543 A1 | 4/2017 |
| WO | 2017099542 | 6/2017 |
| WO | WO-2018022215 A1 | 2/2018 |

OTHER PUBLICATIONS

Taiwan Search Report—TW108107029—TIPO—Aug. 25, 2022.
Jian H., et al., "Throughput Optimization of Multiple Association-Based Software Defined Dense WLAN EDCA", Chinese High Technology Letters, 2018, vol. 28, Issue 1: 15-21, High Technology Letters No. 1, Jan. 15, 2018, DOI: 10.3772/J.ISSN. 1002-0470. 2018. 01.003, 11 Pages, Full text 1-29.
Lucent Technologies: "Draft CR to 21.905 for WLAN Interworking", TSG-SA1 SWG #18, S1-022156, Busan, Korea, Nov. 11-15, 2002, 56 Pages.
"PCT Application No. PCT/US2019/019991 International Search Report and Written Opinion", May 2, 2019, 12 pages.
"PCT Application No. PCT/US2019/020000 International Search Report and Written Opinion", May 17, 2019, 13 pages.
"U.S. Appl. No. 16/288,025 Final Office Action", Oct. 1, 2020, 15 pages.
"U.S. Appl. No. 16/288,025 Office Action", May 28, 2020, 17 pages.
"U.S. Appl. No. 16/288,037 Final Office Action", Apr. 27, 2021, 21 pages.
"U.S. Appl. No. 16/288,037 Office Action", Sep. 29, 2020, 23 pages.
Hiertz, et al., "Multiple BSSID element", IEEE Draft, vol. 802. 11ax, Aug. 25, 2015, 16 pages.
Taiwan Search Report—TW112124192—TIPO—Sep. 6, 2024.

* cited by examiner

CONDITIONAL INHERITANCE IN MANAGEMENT FRAME FOR MULTI-LINK AGGREGATION

CROSS-REFERENCE TO RELATED APPLICATIONS

This Patent Application is a continuation of U.S. patent application Ser. No. 16/288,037 filed on Feb. 27, 2019, entitled "CONDITIONAL INHERITANCE IN MANAGEMENT FRAME FOR MULTI-LINK AGGREGATION," which claims priority to U.S. Provisional Patent Application No. 62/636,287 filed on Feb. 28, 2018 and U.S. Provisional Patent Application No. 62/685,904 filed on Jun. 15, 2018, both entitled "CONDITIONAL INHERITANCE IN MANAGEMENT FRAME FOR MULTIPLE BASIC SERVICE SETS," and assigned to the assignee hereof. The disclosures of the prior applications are considered part of and are incorporated by reference in this patent application.

TECHNICAL FIELD

This disclosure relates generally to the field of communication systems, and more particularly to wireless local area networks (WLANs).

DESCRIPTION OF THE RELATED TECHNOLOGY

An access point (AP) of a wireless local area network (WLAN) can enable wireless network access for a client device (also referred to as a station, or STA). The AP may provide a wireless coverage area used by one or more STAs to access the WLAN. A Basic Services Set (BSS) may be defined as one AP, the wireless channel configuration, and the set of STAs that are wirelessly associated with the AP. The wireless channel configuration may utilize a portion of a frequency band (such as a 2.4 GHz frequency band, a 5 GHz frequency band, etc.). Within each frequency band, there may be different channels which an AP may utilize as part of the wireless channel configuration. Furthermore, the AP may utilize more than one antenna. For example, multiple-input-multiple-output (MIMO) communication may use multiple antennas that are operated by the AP to communicate using the wireless channel configuration.

Multiple APs may be used within the same geographical area to support larger quantities of STAs or to separate traffic among groups of STAs. In the past, a single WLAN apparatus may have operated only one AP. Recently, a single WLAN apparatus may be configured to operate multiple virtual APs (for multiple BSSs) from the same WLAN apparatus. Each virtual AP may be associated with a different BSS identifier (BSSID).

SUMMARY

The systems, methods, and devices of this disclosure each have several innovative aspects, no single one of which is solely responsible for the desirable attributes disclosed herein.

One innovative aspect of the subject matter described in this disclosure can be implemented by an apparatus that may be configurable to provide functions of at least a first access point (AP) corresponding to a first basic service set (BSS) for multi-link aggregation. The apparatus may establish a first communication link with a first STA of the first BSS using a first frequency band. The apparatus may determine a first link profile for a second communication link available for the first STA by customizing one or more management elements of management information associated with the first communication link. The first link profile may include the one or more customized management elements for use by the second communication link. The second communication link may be associated with a second frequency band. The apparatus may configure a first non-inheritance element of the first link profile associated with the second communication link to indicate usage of at least one management element of the management information by the second communication link is disabled. The apparatus may generate a management frame that comprises the first link profile, and may output the management frame for transmission to the first STA.

In some implementations, the first communication link may be an anchor communication link for establishing a wireless association with the first STA, and the second communication link may be a candidate communication link for the first STA for implementing the multi-link aggregation.

In some implementations, the apparatus may determine to establish the second communication link in response to receiving a communication from the first STA indicating the first STA supports establishing the second communication link based, at least in part, on the first link profile.

In some implementations, the second communication link may be dynamically enabled or disabled by the apparatus or the first STA based, at least in part, on an amount of active traffic between the apparatus and the first STA.

In some implementations, the second communication link may be established without performing a separate wireless association process between the apparatus and the first STA for the second communication link.

In some implementations, the apparatus may determine a second link profile for a third communication link available for the first STA by customizing one or more management elements of the management information associated with the first communication link. The second link profile may include the one or more customized management elements for use by the third communication link. The third communication link may be associated with a third frequency band, and the management frame may further include the second link profile.

In some implementations, the apparatus may configure a second non-inheritance element of a second link profile associated with a third communication link to indicate usage of at least one management element of the management information by the third communication link is disabled. The management frame may further include the second link profile.

In some implementations, the management elements of the management information associated with the first communication link that are not customized for the second communication link in the first link profile and are not included in the first non-inheritance element are inherited by the second communication link for use by the second communication link.

In some implementations, the management frame may be a beacon frame, a probe response frame, an association response frame, or a re-association response frame, and the management information may include at least one member of the group consisting of management elements, fields, features, and capabilities.

Another innovative aspect of the subject matter described in this disclosure can be implemented by a first apparatus. The first apparatus may receive, via a first communication link, a management frame from a second apparatus configurable to provide functions of at least a first AP associated with a first BSS. The first apparatus may determine a link profile associated with a second communication link available to the first apparatus for multi-link aggregation. The link profile may be included in the management frame and may have one or more customized management elements of the management information associated with the first communication link. The one or more customized management elements may be for use by the second communication link. The first apparatus may determine a non-inheritance element of the link profile indicates usage of at least one management element of the management information by the second communication link is disabled. The first apparatus may determine whether to establish the second communication link between the first apparatus and the second apparatus for multi-link aggregation based, at least in part, on the link profile associated with the second communication link.

In some implementations, the first apparatus may determine support for the one or more customized management elements and the non-inheritance element included in the link profile associated with the second communication link. The first apparatus may establish the second communication link in response to determining the first apparatus supports the one or more customized management elements and the non-inheritance element.

In some implementations, the first apparatus may communicate with the second apparatus to indicate the first apparatus supports establishing the second communication link in response to determining the first apparatus supports the one or more customized management elements and the non-inheritance element.

In some implementations, the first apparatus may determine the first apparatus does not support the one or more customized management elements and the non-inheritance element included in the link profile associated with the second communication link. The first apparatus may determine not to establish the second communication link in response to determining the first apparatus does not support the one or more customized management elements and the non-inheritance element.

In some implementations, the first apparatus may dynamically enable or disable the second communication link based, at least in part, on an amount of active traffic between the first apparatus and the second apparatus.

In some implementations, the second communication link may be established without performing a separate wireless association process between the first apparatus and the second apparatus for the second communication link.

Another innovative aspect of the subject matter described in this disclosure can be implemented by an apparatus for wireless communication. The apparatus may be configurable to provide functions of a first AP corresponding to a first BSS for multi-link aggregation. The apparatus may comprise a processor and memory coupled with the processor and having instructions stored therein which, when executed by the processor, cause the apparatus to establish a first communication link with a first STA of the first BSS using a first frequency band, and determine a first link profile for a second communication link available for the first STA by customizing one or more management elements of management information associated with the first communication link. The first link profile may include the one or more customized management elements for use by the second communication link. The second communication link may be associated with a second frequency band. The instructions, when executed by the processor, may further cause the apparatus to configure a first non-inheritance element of the first link profile associated with the second communication link to indicate usage of at least one management element of the management information by the second communication link is disabled, generate a management frame that comprises the first link profile, and output the management frame for transmission to the first STA.

Another innovative aspect of the subject matter described in this disclosure can be implemented by an apparatus for wireless communication. The apparatus may be configurable to provide functions of a first AP corresponding to a first BSS for multi-link aggregation. The apparatus may include means for establishing a first communication link with a first STA of the first BSS using a first frequency band, and means for determining a first link profile for a second communication link available for the first STA by customizing one or more management elements of management information associated with the first communication link. The first link profile may include the one or more customized management elements for use by the second communication link. The second communication link may be associated with a second frequency band. The apparatus may further include means for configuring a first non-inheritance element of the first link profile associated with the second communication link to indicate usage of at least one management element of the management information by the second communication link is disabled, means for generating a management frame that comprises the first link profile, and means for outputting the management frame for transmission to the first STA.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
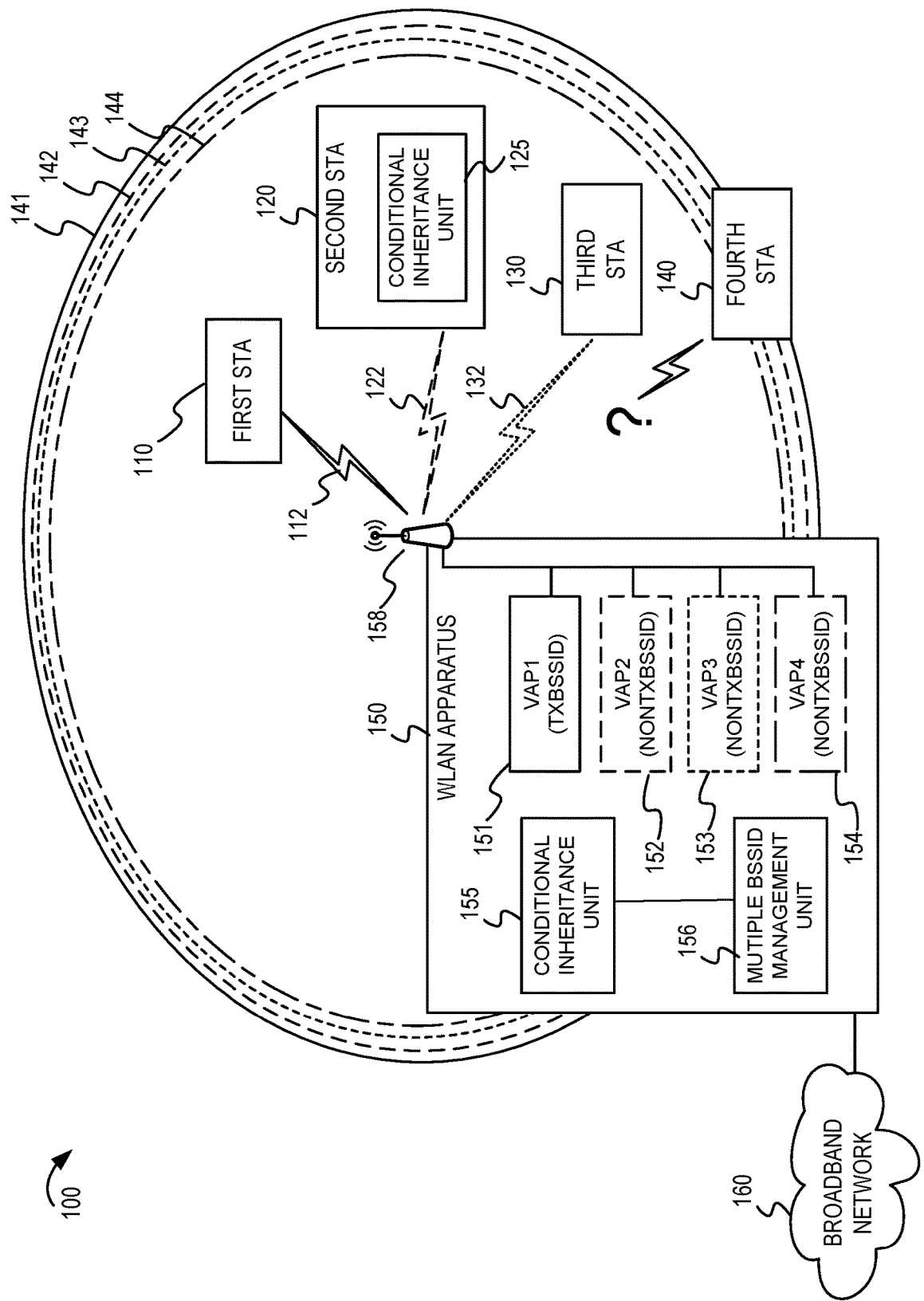
FIG. 1 depicts a system diagram of an example wireless local area network (WLAN) apparatus operating Multiple Basic Service Sets (BSSs).

Stations (STAs) in a wireless local area network (WLAN) can establish a wireless association (also referred to as a wireless link, wireless connection, or the like) with an access point (AP) to access the broadband network via the gateway device. The AP, the wireless channel configuration, and the set of STAs that are wirelessly associated with the AP are referred to as a Basic Services Set (BSS). Typically, an AP would transmit management frames (such as Beacon frames or Probe response frames) to provide information about the BSS to any STAs in the vicinity of the AP.

A WLAN apparatus may operate virtual APs (VAPs) and each VAP may be associated with a different BSS. Each BSS is associated with a different BSS identifier (BSSID). Multiple BSSID capability may refer to a capability of a WLAN apparatus to advertise information for multiple BSSIDs using a single management frame (such as a Beacon frame or Probe Response frame) instead of using multiple Beacon or Probe Response frames, each corresponding to a single BSSID. This has the advantage of reducing network overhead, while enabling multiple BSSs for traffic separation. For example, the WLAN apparatus may indicate buffered frames for these multiple BSSIDs using a single traffic indication map (TIM) element in a single management frame. In some implementations, a first VAP (for a first BSS of the multiple BSSs) may be designated as a primary source for management frames that advertises the information for multiple BSSs, including one or more other BSSs in operation at the WLAN apparatus.

A WLAN apparatus that supports and implements protocols defined in the IEEE 802.11ax standard may implement the multiple BSSID capability. In a multiple BSSID set, the BSSID of one VAP is referred to as the "transmitted BSSID" (or TxBSSID), and the BSSIDs of the rest of the VAPs are referred to as "nontransmitted BSSIDs" (or NonTxBSSIDs). The BSSID of the VAP that transmits the management frame for all of the VAPs of the multiple BSSID set is referred to as the TxBSSID. The BSSIDs of the VAPs that do not transmit the management frame are referred to as the Non-TxBSSIDs. The VAPs corresponding to the NonTxBSSIDs (which may also be referred to as "NonTx VAPs") advertise their management information in the management frame transmitted by the VAP corresponding to the TxBSSID (which may also be referred to as the "Tx VAP"). The management information (which may also be referred to as information elements) that is advertised in the management frame may include elements, fields, capabilities, features, and other information that is associated with one or more of the BSSs.

In IEEE 802.11ax systems, some of the management information associated with the Tx VAP is inherited by each of the NonTx VAPs, and the inheritance for some of the management information (e.g., High Efficiency (HE) capabilities, HE Operations, and other elements) is mandatory. In some scenarios, a NonTx VAP may not want to inherent some of the management information from the Tx VAP, and may instead need to customize the values or configurations of the management information for the NonTx VAP. In other scenarios, the Tx VAP may not want each of the NonTx VAPs to inherent some of the management information, because certain management information may be dependent on the configuration of each NonTx VAP and its corresponding BSS. Some of the management information that can be inherited may be overwritten by a NonTx VAP using its BSS profile if the 802.11ax specification does not specify that the inheritance is mandatory. However, in this situation, the default rule in the 802.11ax specification is that if the NonTx VAP does not override the inheritance using its BSS profile, then the inheritance is applied to the BSS associated with the NonTx VAP. The current version of the 802.11ax specification does not offer an option to both override the inheritance of management information (e.g., a management element or feature) and disable the management element or feature for the BSS. Furthermore, as the IEEE 802.11 standards continue to evolve, additional management information will be added and inheritance associated with the additional management information will need to be addressed.

In some implementations, a WLAN apparatus may implement conditional inheritance for the multiple BSSID set. Conditional inheritance may allow inheritance at a global level with a global inheritance setting, which applies the inheritance to all of the BSSs associated with the NonTx VAPs. Conditional inheritance may also allow inheritance at a per BSS level with a BSS-based inheritance setting. For example, the BSS-based inheritance setting may result in different inheritance settings or configurations for the different NonTx VAPs. The BSS-based inheritance setting can override the global inheritance setting if there is a conflict between the two inheritance settings. Also, conditional inheritance may allow a NonTx VAP to customize any pertinent management information in its BSS profile, and override any BSS-based or global inheritance settings, with a BSS-based profile announcement or configuration. Furthermore, conditional inheritance may allow a NonTx VAP to both override the inheritance of management information (e.g., a management element or feature) and disable the management element or feature for the BSS with a BSS-based profile configuration (e.g., a configuration of the length field). A management element may also be referred to as an element or an information element. In some implementations, a WLAN apparatus that implements conditional inheritance may implement a hybrid approach where the WLAN apparatus applies various combinations of (1) inheritance at a global level by configuring the global inheritance settings in the management frame, (2) inheritance at a BSS level by configuring the BSS-based inheritance settings in the management frame, (3) BSS-based profile announcement or configuration to customize a BSS profile and override inheritance settings, and (4) BSS-based profile configuration to disable management information and override inheritance settings.

Particular implementations of the subject matter described in this disclosure can be implemented to realize one or more of the following potential advantages. Conditional inheritance may allow a greater degree of customization for various NonTx VAPs (and their corresponding BSSs) having different configurations, capabilities, and requirements, while still transmitting a single management frame for the multiple BSSID set. Also, conditional inheritance continues to use inheritance to reduce the size of the management frame, and includes additional options for inheritance with the BSS-based and global inheritance settings. Furthermore, conditional inheritance can address additional management information that will be added in the future to the IEEE 802.11 standards.

FIG. 1 depicts a system diagram of an example WLAN apparatus operating Multiple BSSs. The system diagram 100 includes a WLAN apparatus 150 which is communicatively coupled to a broadband network 160. The WLAN apparatus 150 may be communicatively coupled (or co-located) with a gateway device (not shown). A gateway device, such as a modem or router, may provide access to the broadband network 160. For example, the gateway device can couple to the broadband network through a cable, a fiber optic, a powerline, or DSL network connection. The WLAN apparatus 150 may operate multiple VAPs, such as a first VAP 151 (or VAP1) associated with a first BSS, a second VAP 152 (or VAP2) associated with a second BSS, a third VAP 153 (or VAP3) associated with a third BSS, and a fourth VAP 154 (or VAP4) associated with a fourth BSS. The first VAP 151 may provide a first coverage area 141. Similarly, the second VAP 152 may provide a second coverage area 142, the third VAP 153 may provide a third coverage area 143, and the fourth VAP 154 may provide a fourth coverage area 144. For illustration purposes, the first coverage area 141, second coverage area 142, third coverage area 143, and fourth coverage area 144 are shown as different size ovals in the diagram. However, the sizes of the coverage areas may be similar to each other and the shapes of the coverage areas may vary as a result of environmental obstructions or interference. The WLAN apparatus 150 may have one or more antennas 158. In some implementations, the VAPs 151, 152, 153, and 154 may share the same one or more antennas 158. In some implementations, the WLAN apparatus 150 may be an AP that implements the VAPs 151, 152, 153, and 154.

In some implementations, the WLAN apparatus 150 may include a conditional inheritance unit 155 and a multiple BSSID management unit 156. The conditional inheritance unit 155 may determine the capabilities, features, and requirements of the multiple VAPs of the WLAN apparatus and implement the various conditional inheritance settings, such as the BSS-based profile announcement or configuration, the BSS-based inheritance setting, and global inheritance setting, as will be further described below. The multiple BSSID management unit 156 may manage the multiple BSSID capabilities for the WLAN apparatus 150, including operating the multiple VAPs of the WLAN apparatus 150, obtaining the conditional inheritance settings determined by the conditional inheritance unit 155, and generating the management frame for the multiple BSSIDs based on the conditional inheritance settings. In some implementations, the VAPs 151-154, the conditional inheritance unit 155, and the multiple BSSID management unit 156 may be included in a communication module (not shown) of the WLAN apparatus 150 and may be implemented by one or more processors of the communication module. The communication module may include other network interface related components, such as one or more modems, analog front end (AFE), and the one one or more antennas 158.

In FIG. 1, each of the VAPs 151, 152, 153, and 154 are associated with different BSSIDs and are part of a Multiple BSSID set. In some implementations, the Multiple BSSID set and associated VAPs may be specific to a frequency band, such as a 2.4 GHz frequency band, a 5 GHz frequency band, etc. Each BSS can have different wireless associations with client stations (which may also be referred to as stations (STAs)). A STA can establish a wireless association (also referred to as a wireless link, wireless connection, or the like) with a VAP to access the broadband network 160 via the WLAN apparatus 150. In FIG. 1, a first STA 110 has a first wireless association 112 with a first BSSID (corresponding to the first VAP 151). A second STA 120 has a second wireless association 122 with a second BSSID (corresponding to the second VAP 152). A third STA 130 has a third wireless association 132 with a third BSSID (corresponding to the third VAP 153).

A fourth STA 140 may enter the vicinity of the WLAN apparatus 150. The fourth STA 140 may observe a management frame (such as a Beacon Frame or Probe Response Frame) to determine the BSSID(s) available from the WLAN apparatus 150. For example, the first VAP 151 (TxBSSID) may periodically broadcast a Beacon Frame. In some implementations, the fourth STA 140 may transmit a Probe Request Frame to the WLAN apparatus 150 to request a Probe Response Frame. The management frame (whether it is a Beacon Frame, a Probe Response Frame, or some other management frame) may indicate the TxBSSID of the first VAP 151. Furthermore, the management frame may indicate some or all of the NonTxBSSIDs of the other BSSs (corresponding to VAPs 152, 153, and 154) in operation at the WLAN apparatus 150. In accordance with this disclosure, the WLAN apparatus 150 may include conditional inheritance settings when generating the management frame for the multiple BSSID set.

In some implementations, the conditional inheritance unit 155 may determine BSS-related information and configuration for each of the BSSs associated with the VAPs 152, 153, and 154 (i.e., the NonTx VAPs). The conditional inheritance unit 155 may use the BSS-related information to determine the management information that is inherited or configured for each of the BSSs associated with the NonTx VAPs, which may be referred to an inheritance configuration of the management information. For example, the BSS-related information may include the capabilities, configurations, requirements, and restrictions of each of the BSSs associated with the VAPs 152, 153, and 154 (i.e., the NonTx VAPs). The conditional inheritance unit 155 may determine whether to apply new global inheritance settings or configuration, or modify existing global inheritance settings or configurations, based on the BSS-related information, as will be further described in FIG. 2. Instead of determining new global inheritance settings or modifying existing global inheritance settings, the conditional inheritance unit 155 may override some of the global inheritance settings by determining and applying BSS-based inheritance settings for one or more of the BSSs associated with the NonTx VAPs based on the BSS-related information, as will be further described in FIG. 3. Furthermore, the conditional inheritance unit 155 may determine to customize management information in one or more of the BSS profile, and override any conflicting BSS-based or global inheritance settings, with a BSS-based profile announcement or configuration based on the BSS-related information, as will be further described in FIG. 4. Also, the conditional inheritance unit 155 may determine to disable a management element of management information associated with one or more BSS profiles of one or more of the NonTx VAPs with a BSS-based profile configuration. For example, a field (e.g., length field) of the management element of one of the BSS profiles can be configured to disable the management element (and also override any BSS-based or global inheritance setting for that management element). In another example, each BSS profile may include a non-inheritance element, and the non-inheritance element may be configured for each BSS profile to indicate one or more management elements that will be disabled for the corresponding BSS (which also overrides any BSS-based or global inheritance setting for the one or more management elements). The non-inheritance element of a BSS profile may list the one or more management elements that will be disabled for the NonTxBSSID associated with the BSS profile and that will not inherit the BSS-based or global inheritance settings, as will be further described in FIG. 4. The term management element is used in various examples in this disclosure; however, a management element also may be referred to as an element or an information element.

In some implementations, the conditional inheritance unit 155 of the WLAN apparatus 150 may implement conditional inheritance using a hybrid approach, where the conditional inheritance unit 155 applies various combinations of (1) inheritance at a global level by configuring the global inheritance settings in the management frame, (2) inheritance at a BSS level by configuring the BSS-based inheritance settings in the management frame, (3) BSS-based profile announcement or configuration to customize a BSS profile and override inheritance settings, and (4) BSS-based profile configuration to disable management information and override inheritance settings.

In some implementations, the multiple BSSID management unit 156 may work in conjunction with the conditional inheritance unit 155 to generate and transmit the management frame that includes the conditional inheritance settings. The multiple BSSID management unit 156 may determine the conditional inheritance settings from the conditional inheritance unit 155, configure the conditional inheritance settings in the management frame, and generate and transmit the management frame to the WLAN 100. The first STA 110, the second STA 120, and the third STA 130 may receive the management frame and communicate with the corresponding VAP of the WLAN apparatus 150. The fourth STA 140 may also receive the management frame and determine whether to establish a wireless association with one of the VAPs of the WLAN apparatus 150 based on the management frame.

In some implementations, each of the STAs 110, 120, 130, and 140 may include a conditional inheritance unit to process the management frame received from the WLAN apparatus 150. For example, as shown in FIG. 1, the second STA 120 may include a conditional inheritance unit 125. The STAs 110, 130, 140 may also each include a conditional inheritance unit; however, these conditional inheritance units are not shown in FIG. 1 for simplicity. In some implementations, after receiving the management frame, the conditional inheritance unit 125 of the second STA 120 may process the management frame to determine which management information elements are inherited and which are not inherited, for example. The conditional inheritance unit 125 may parse and process some of the elements related to inheritance for the NonTxBSSID associated with the VAP 152, such as the BSS-based inheritance setting and the global inheritance setting associated with the VAP 152. The conditional inheritance unit 125 may also access the BSS profile associated with the VAP 152 to determine management information elements that are customized or configured for the VAP 152. After processing the management frame, the second STA 120 may communicate with the VAP 152 of the WLAN apparatus 150.

Figure 2:
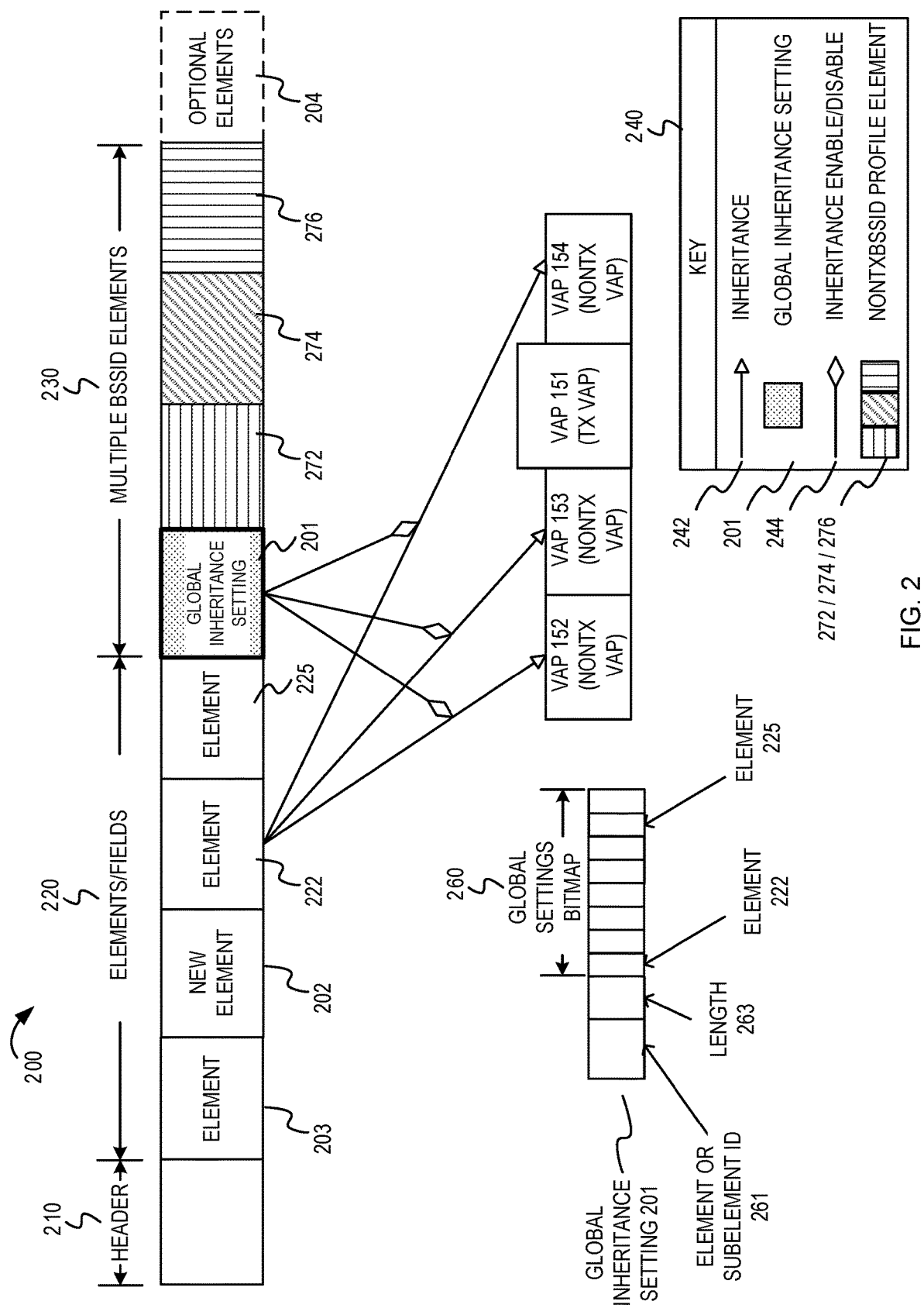
FIG. 2 depicts a conceptual diagram of an example multiple BSS identifier (BSSID) management frame that includes a global inheritance setting.

FIG. 2 depicts a conceptual diagram of an example multiple BSSID management frame that includes a global inheritance setting. The multiple BSSID management frame 200 may be a Beacon frame, a Probe Response frame, an Association Response frame, a Re-Association Response frame, or other types of management frames. The multiple BSSID management frame 200 may include a header 210, elements/fields 220, and multiple BSSID elements 230.

The elements/fields 220 may include elements, fields, features, capabilities, and other management information from the Tx VAP (e.g., VAP 151) that can be inherited by the NonTx VAPs (e.g., VAPs 152, 153, and 154). For example, element 222 of the multiple BSSID management frame 200 that will be broadcast by the VAP 151 can be inherited by the VAPs 152, 153, and 154, as shown by the inheritance arrows 242 in FIG. 2 (with reference to the key 240). The multiple BSSID elements 230 may include a global inheritance settings 201 (as shown by the dotted box in the multiple BSSID elements 230 and in the key 240), and also NonTxBSSID profile element 272, NonTxBSSID profile element 274, and NonTxBSSID profile element 276 (as shown by the striped boxes in the multiple BSSID elements 230 and in the key 240). The NonTxBSSID profile elements 272, 274, and 276 include management information for VAPs 152, 153, and 154, respectively, which are not inherited from the VAP 151 or override the inheritance settings from the VAP 151. As described above, the global inheritance setting 201 can be configured for each of the management information that can be inherited by the VAPs 152, 153, and 154 to control whether the inheritance is enabled or disabled, which may be referred to as a global inheritance configuration. The global inheritance settings 201 may be included in either one of the elements or sub-elements of the multiple BSSID elements 230. In the example of FIG. 2, the global inheritance settings 201 can be configured to enable or disable the inheritance of the element 222 for all of the VAPs 152, 153, and 154, as shown by the inheritance enable/disable arrows 244 (with reference to the key 240). Similar to element 222, the global inheritance settings 201 may be configured to enable or disable the inheritance of the element 225 for all of the VAPs 152, 153, and 154. For example, the global inheritance settings 201 may enable the inheritance of the element 222 for all of the VAPs 102, 104, and 108, and the global inheritance settings 201 may disable the inheritance of the element 225 for all of the VAPs 152, 153, and 154. The elements 222 and 225 are just two examples of management information that may be included in the elements/fields 220 from the Tx VAP (e.g., VAP 151) that can be inherited by the NonTx VAPs (e.g., VAPs 152, 153, and 154). For example, a partial list of some of the management information (which may also be referred to as management information elements) that can be inherited by the NonTx VAPs is the following: Timestamp, Beacon Interval, DSSS Parameter Set, IBSS Parameter Set, Country information, Channel Switch Announcement, Extended Channel Switch Announcement, Wide Bandwidth Channel Switch, Transmit Power Envelope, Supported Operating Classes, IBSS DFS, ERP Information, HT Capabilities, HT Operation, VHT Capabilities, VHT Operation, HE Capabilities, HE Operation, BSS Color Change Announcement, Spatial Reuse Parameter Set, UORA parameter set, and Broadcast TWT parameters. It is noted, however, that the management information may include additional management information that may be specified by the IEEE 802.11 specifications, such as current or future versions of the IEEE 802.11ax specification.

In some implementations, the global inheritance settings 201 may be implemented as a bitmap in an existing element or sub-element, or in a new element or sub-element, of the multiple BSSID elements 230. The example diagram of the global inheritance settings 201 shown in FIG. 2 includes a global settings bitmap 260, the element or sub-element ID 261, and the length field 263. In some implementations, the global settings bitmap 260 includes one bit for each of the elements, fields, features, capabilities and other management information that are available for the VAPs 152, 153, and 154. For example, if there are 100 different management information elements, the global settings bitmap 260 may include 100 different bits in a predefined order, where the order or placement within the bitmap determines which management information element the bit is associated with. In some implementations, the predefined order of the management information elements may be specified by the IEEE 802.11 specifications, such as current or future versions of the IEEE 802.11ax specification. In the example shown in FIG. 2, the first bit in the global settings bitmap 260 is associated with the element 222, and the seventh bit in the global settings bitmap 260 is associated with the element 225. Each of the bits of the global settings bitmap 260 indicates whether or not the corresponding management information should be inherited by each of the VAPs 152, 153, and 154. For example, the bit associated with the element 222 may indicate whether or not the VAPs 152, 153, and 154 should inherit the element 222 from the VAP 151. Also, the bit associated with the element 225 may indicate whether or not the VAPs 152, 153, and 154 should inherit the element 225 from the VAP 151.

In some implementations, instead of a bitmap having bits in a predefined order, the global inheritance settings 201 may be implemented as an element ID bitmap having an element ID for each of the management information elements. For example, if there are 100 different management information elements, the element ID bitmap may include 100 different element IDs that are associated with the corresponding 100 different management information elements. Also, the order or bit position of the bit in the bitmap may correspond to the element ID. For example, the bit position 15 may correspond to the management information element with an element ID of 15. For management information elements that have element ID extensions (according to the IEEE 802.11 specifications) with element ID beyond 255, the element ID extension may be used in addition to the element ID. For example, a management information element with element ID extension of 10 may correspond to a bit position 265, and so on. In another example, the IEEE 802.11 specifications may specify a predefined order of the management information elements carried in a particular management frame (for example, the order of elements in a Beacon frame), and the bitmap may correspond to the predefined order, such that a management information element having an order position at 15 may be indicated by a bit number 15. In some implementations, inheritance may apply for a particular management information element if the particular management information element is being advertised by the multiple BSSID management frame. If the management information element is not advertised by the multiple BSSID management frame, then the element and thus corresponding entry or bit in the bitmap may be ignored. In some implementations, the element IDs and element ID extensions that are associated with corresponding management information elements may be specified by the IEEE 802.11 specifications, such as current or future versions of the IEEE 802.11ax specification.

In some implementations, as shown in FIG. 2, instead of being included in one of the elements or sub-elements of the multiple BSSID elements 230, the global inheritance settings may be included in one of the elements or sub-elements or fields of the elements/fields 220 (as shown in 203), or the global inheritance settings may be included in a new element or a new sub-element or a new field of the elements/fields 220 (as shown in 202). As shown in FIG. 2, the multiple BSSID elements 230 may include optional elements 204. In some implementations, the global inheritance settings may be included in an optional element or sub-element of the optional elements 204.

Figure 3:
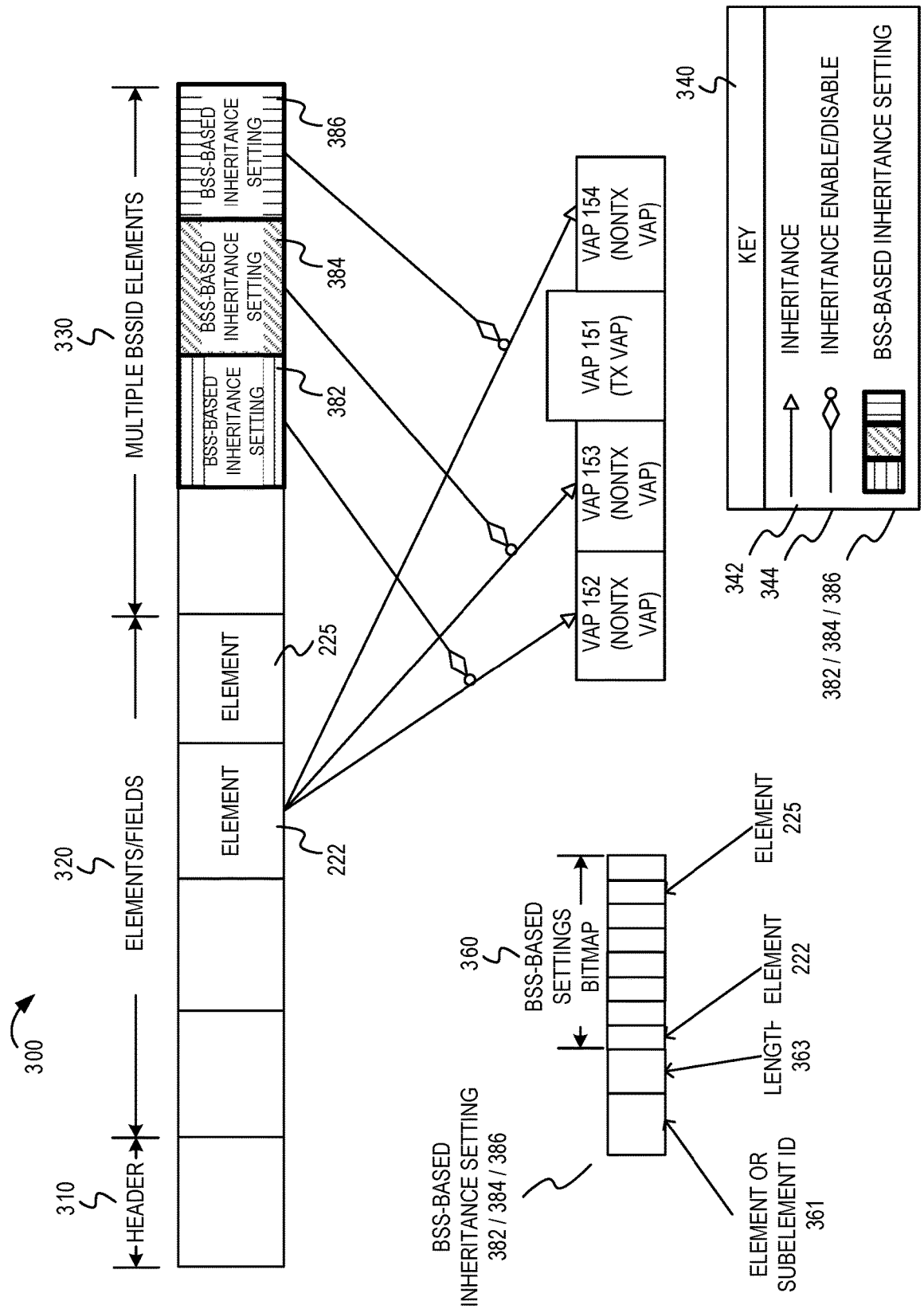
FIG. 3 depicts a conceptual diagram of an example multiple BSSID management frame that includes BSS-based inheritance settings.

FIG. 3 depicts a conceptual diagram of an example multiple BSSID management frame 300 that includes BSS-based inheritance settings. The multiple BSSID management frame 300 may be a Beacon frame, a Probe Response frame, an Association Response frame, a Re-Association Response frame, or other types of management frames. The multiple BSSID management frame 300 may include a header 310, elements/fields 320, and multiple BSSID elements 330.

The elements/fields 320 may include elements, fields, features, capabilities, and other management information from the Tx VAP (e.g., VAP 151) that can be inherited by the NonTx VAPs (e.g., VAPs 152, 153, and 154). For example, element 222 of the multiple BSSID management frame 300 that will be broadcast by the VAP 151 can be inherited by the VAPs 152, 153, and 154, as shown by the inheritance arrows 342 in FIG. 3 (with reference to the key 340). The multiple BSSID elements 330 may include BSS-based inheritance settings 382, 384, and 386 (as shown by the striped boxes in the multiple BSSID elements 330 and in the key 340). The BSS-based inheritance settings 382 may be used to configure and apply BSS level inheritance for each of the management information that can be inherited by the BSS associated with the VAP 152 to control whether the inheritance is enabled or disabled. The BSS-based inheritance settings 384 may be used to configure and apply BSS level inheritance for each of the management information that can be inherited by the BSS associated with the VAP 153 to control whether the inheritance is enabled or disabled. The BSS-based inheritance settings 386 may be used to configure and apply BSS level inheritance for each of the management information that can be inherited by the BSS associated with the VAP 154 to control whether the inheritance is enabled or disabled.

In the example of FIG. 2, the BSS-based inheritance settings 382 can be configured to enable or disable the inheritance of the element 222 for the VAP 152, the BSS-based inheritance settings 384 can be configured to enable or disable the inheritance of the element 222 for the VAP 153, and the BSS-based inheritance settings 386 can be configured to enable or disable the inheritance of the element 222 for the VAP 154, as shown by the inheritance enable/disable arrows 344 (with reference to the key 340). Similar to element 222, the BSS-based inheritance settings 382, 384, and 386 may be independently configured to enable or disable the inheritance of the element 225 independently for each of the VAPs 152, 153, and 154, respectively. For example, the BSS-based inheritance settings 382 and 384 may enable the inheritance of the element 222 for the VAP 152 and 153, respectively, and the BSS-based inheritance settings 386 may disable the inheritance of the element 225 for the VAP 154. As described above, the BSS-based inheritance settings 382, 384, and 386 may also override the global inheritance settings (e.g., global inheritance setting 201) if there is a conflict between the BSS-based and global inheritance settings.

In some implementations, the BSS-based inheritance settings 382, 384, and 386 may be implemented as a bitmap in an existing element or sub-element, or in a new element or sub-element, of the multiple BSSID elements 330. The example diagram of the BSS-based inheritance settings 382, 384, and 386 shown in FIG. 3 includes a BSS-based settings bitmap 360, the element or sub-element ID 361, and the length field 363. Similarly as described above for the global settings bitmap 260 of FIG. 2, in some implementations, the BSS-based settings bitmap 360 includes one bit for each of the elements, fields, features, capabilities and other management information that are available for the VAPs 152, 153, and 154. The different bits of the bitmap are in a predefined order, where the order or placement within the bitmap determines which management information element the bit is associated with. In some implementations, the predefined order of the management information elements may be specified by the IEEE 802.11 specifications, such as current or future versions of the IEEE 802.11ax specification. In the example shown in FIG. 3, the first bit in the BSS-based settings bitmap 360 is associated with the element 222, and the seventh bit in the BSS-based settings bitmap 360 is associated with the element 225. Each of the bits of the BSS-based settings bitmap 360 indicates whether or not the corresponding management information should be inherited by the corresponding VAP. For example, for the BSS-based inheritance settings 382 associated with the VAP 152, the bit associated with the element 222 may indicate whether or not the VAP 152 should inherit the element 222 from the VAP 151. Also, the bit associated with the element 225 may indicate whether or not the VAP 152 should inherit the element 225 from the VAP 151.

Similarly as described above for FIG. 2, in some implementations, instead of a bitmap having bits in a predefined order, each of the BSS-based inheritance settings 382, 384, and 386 shown in FIG. 3 may be implemented as an element ID bitmap having an element ID for each of the management information elements. For example, if there are 100 different management information elements, the element ID bitmap may include 100 different element IDs that are associated with the corresponding 100 different management information elements. Also, the order or bit position of the bit in the bitmap may correspond to the element ID. For example, the bit position 15 may correspond to the management information element with an element ID of 15. For management information elements that have element ID extensions (according to the IEEE 802.11 specifications) with element ID beyond 255, the element ID extension may be used in addition to the element ID. For example, a management information element with element ID extension of 10 may correspond to a bit position 265, and so on. In another example, the IEEE 802.11 specifications may specify a predefined order of the management information elements carried in a particular management frame (for example order of elements in a Beacon frame), and the bitmap may correspond to the predefined order, such that a management information element having an order position at 15 may be indicated by a bit number 15. In some implementations, inheritance may apply for a particular management information element if the particular management information element is being advertised by the multiple BSSID management frame. If the management information element is not advertised by the multiple BSSID management frame, then the element and thus corresponding entry or bit in the bitmap may be ignored. In some implementations, the element IDs and element ID extensions that are associated with corresponding management information elements may be specified by the IEEE 802.11 specifications, such as current or future versions of the IEEE 802.11ax specification.

In some implementations, as shown in FIG. 3, the BSS-based inheritance settings 382, 384, and 386 may be included in existing or new elements or sub-elements or fields of the multiple BSSID elements 330. Furthermore, since the BSS-based inheritance settings 382 is associated with the VAP 152, a bit or other signal or indication may be stored in the NonTxBSSID profile element (or sub-element or field) associated with the VAP 152 to indicate that the VAP 152 has the BSS-based inheritance settings 382. Also, a bit or other signal or indication may be stored in the NonTxBSSID profile element (or sub-element or field) associated with the VAP 153 to indicate that the VAP 153 has the BSS-based inheritance settings 384, and a bit or other signal or indication may be stored in the NonTxBSSID profile element (or sub-element or field) associated with the VAP 154 to indicate that the VAP 154 has the BSS-based inheritance settings 386. It is noted that there are various other signals or indications that may be used; for example, one or more existing or reserved bits or fields in a NonTxBSSID profile element may be repurposed to serve as a signal or indication that the corresponding VAP has a BSS-based inheritance setting.

Figure 4:
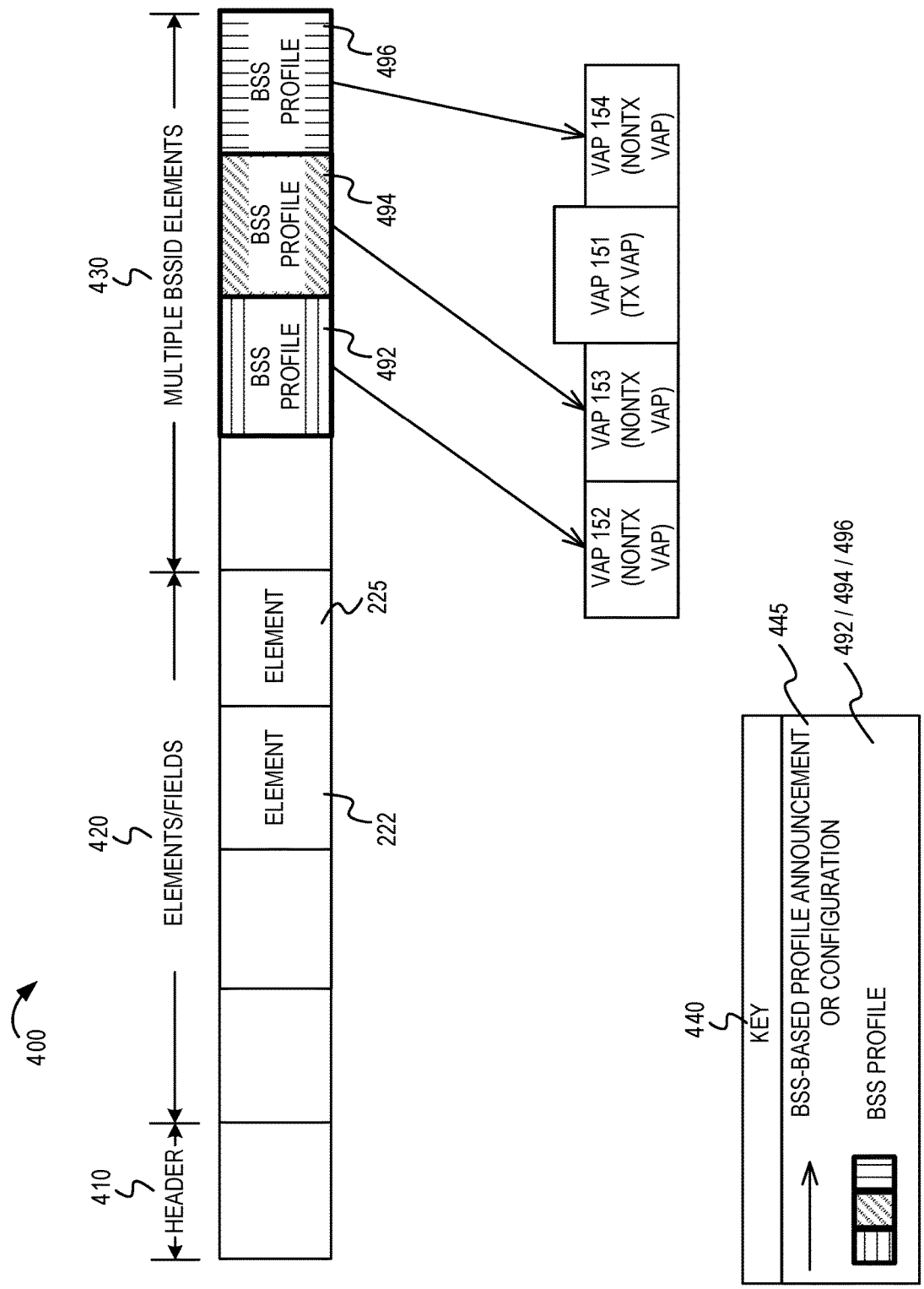
FIG. 4 depicts a conceptual diagram of an example multiple BSSID management frame that includes BSS-based profile announcement.

FIG. 4 depicts a conceptual diagram of an example multiple BSSID management frame 400 that includes BSS-based profile announcement. The multiple BSSID management frame 400 may be a Beacon frame, a Probe Response frame, an Association Response frame, a Re-Association Response frame, or other types of management frames. The multiple BSSID management frame 400 may include a header 410, elements/fields 420, and multiple BSSID elements 430.

The elements/fields 420 may include elements, fields, features, capabilities, and other management information from the Tx VAP (e.g., VAP 151) that can be inherited by the NonTx VAPs (e.g., VAPs 152, 153, and 154). For example, elements 222 and 225 of the multiple BSSID management frame 400 that will be broadcast by the VAP 151 can be inherited by the VAPs 152, 153, and 154, as described above in FIGS. 2 and 3. The multiple BSSID elements 430 may include BSS profile 492, BSS profile 494, and BSS profile 496. As described above, the BSS profiles 492, 494, and 496 may specify management information that is customized or configured for the corresponding NonTxBSSID, and which may also override any BSS-based or global inheritance setting associated with the Tx VAP (e.g., VAP 151). The BSS profile 492 may specify management information that is customized or configured for the NonTxBSSID associated with VAP 152, the BSS profile 494 may specify management information that is customized or configured for the NonTxBSSID associated with VAP 153, and the BSS profile 496 may specify management information that is customized or configured for the NonTxBSSID associated with VAP 154. For example, the BSS profile 492 may customize or configure one or more management information elements to enable a specific configuration for the one or more management information elements for the NonTxBSSID associated with VAP 152 (and override any BSS-based or global inheritance setting), and may customize or configure one or more management information elements to disable the one or more management information elements for the NonTxBSSID associated with VAP 152 (and override any BSS-based or global inheritance setting). The BSS profile 494 may customize or configure one or more management information elements to enable a specific configuration for the one or more management information elements for the NonTxBSSID associated with VAP 153 (and override any BSS-based or global inheritance setting), and may customize or configure one or more management information elements to disable the one or more management information elements for the NonTxBSSID associated with VAP 153 (and override any BSS-based or global inheritance setting). The BSS profile 496 may customize or configure one or more management information elements to enable a specific configuration for the one or more management information elements for the NonTxBSSID associated with VAP 154 (and override any BSS-based or global inheritance setting), and may customize or configure one or more management information elements to disable the one or more management information elements for the NonTxBSSID associated with VAP 154 (and override any BSS-based or global inheritance setting).

In some implementations, the management information in a BSS profile (e.g., any of the BSS profiles 492, 494, and 496) may be customized using a BSS-based profile announcement, which may also be referred to as a BSS-based profile configuration. The BSS-based profile announcement can customize a value, feature, field, or other configuration of a specific management information element of the particular BSS profile. For example, as shown in FIG. 4, a BSS-based profile announcement (shown by the arrows 445 of the key 440) can customize a management information element in the BSS profile 492 for the VAP 152, a BSS-based profile announcement can customize a management information element in the BSS profile 494 for the VAP 153, and a BSS-based profile announcement can customize a management information element in the BSS profile 496 for the VAP 154. When a specific management information element is customized in a BSS profile, the configuration for that specific management information element that is in the particular BSS profile overrides any BSS-based or global inheritance setting for that specific management information element for the corresponding NonTxBSSID. For example, a partial list of some of the management information (or management information elements) that can be included and customized in the BSS profile of a NonTxBSSID associated with a VAPs is the following: Timestamp, Beacon Interval, DSSS Parameter Set, IBSS Parameter Set, Country information, Channel Switch Announcement, Extended Channel Switch Announcement, Wide Bandwidth Channel Switch, Transmit Power Envelope, Supported Operating Classes, IBSS DFS, ERP Information, HT Capabilities, HT Operation, VHT Capabilities, VHT Operation, HE Capabilities, HE Operation, BSS Color Change Announcement, Spatial Reuse Parameter Set, UORA parameter set, and Broadcast TWT parameters. It is noted, however, that the management information may include additional management information that may be specified by the IEEE 802.11 specifications, such as current or future versions of the IEEE 802.11ax specification.

In some implementations, a management information element of a BSS profile associated with a NonTxBSSID may also be customized (e.g., using BSS-based profile configuration) to both override the inheritance of the management information element and disable the management information element for that particular NonTxBSSID. The VAP associated with NonTxBSSID may determine to disable the management information element for that particular NonTxBSSID for various reasons, such as that the NonTxBSSID does not support or does not want to enable that particular management information element that is supported by the TxBSSID, or that the feature associated with the particular management information element is not used by the devices (e.g., STAs) associated with the TxBSSID. For example, a NonTxBSSID may determine it does not want to enable the Broadcast TWT parameter, because the number of STAs associated with that particular NonTxBSSID is small and manageable without enabling the Broadcast TWT parameter.

In some implementations, the BSS-based profile configuration may include, for example, a null element that is associated with the management information element to indicate that the management information element is disabled for that BSS and to override any inheritance settings for that management information element. A null element may be defined as an element that does not have any information or content. For example, it does not have any information or content in the element ID field, length field, or element ID extension field (if exists). The BSS-based profile configuration may include, for example, configuring the length field of the management information element in the corresponding BSS profile to indicate the management information element is disabled for that BSS and to override any inheritance settings for that management information element. For example, configuring a management information element with a length field set to zero (i.e., 0) when the element ID (defined by the IEEE 802.11 specifications) is less than 255 indicates that the management information element will be disabled for the corresponding BSS and also the management information element will not be inherited by the BSS (i.e., this configuration also overrides inheritance settings). Furthermore, configuring a management information element with a length field set to one (i.e., 1) when the element ID is set to 255 and the element ID extension field (defined by the IEEE 802.11 specifications) carries a non-zero value indicates that the management information element will be disabled for the corresponding BSS and also the management information element will not be inherited by the BSS (i.e., this configuration also overrides inheritance settings).

In some implementations, a non-inheritance element may be included in a BSS profile associated with a NonTxBSSID to indicate which management elements (that are supported by the TxBSSID) are disabled and not inherited for the NonTxBSSID, and hence which features associated with these management elements are not enabled and not supported by the devices (e.g., STAs) associated with the NonTxBSSID. The non-inheritance element may be configured for a BSS profile associated with a NonTxBSSID to indicate one or more management elements that will be disabled for the corresponding BSS. Disabling the one or more management elements for the NonTxBSSID also overrides any BSS-based or global inheritance setting associated with the TxBSSID for the one or more management elements. The non-inheritance element of the BSS profile may list the one or more management elements that will be disabled for the NonTxBSSID associated with the BSS profile.

Figure 5:
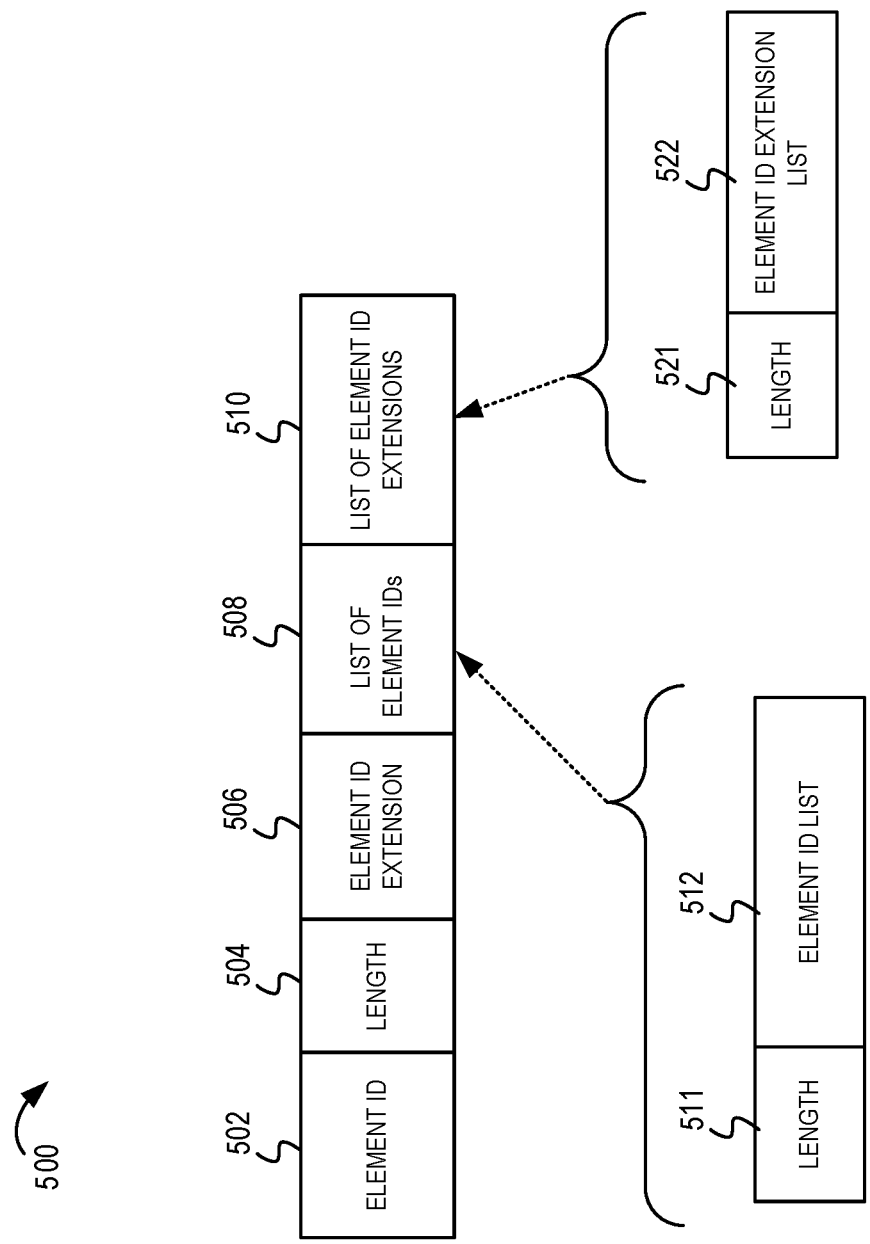
FIG. 5 depicts an example non-inheritance element that provides a list of management elements of a multiple BSSID management frame that are disabled for a BSS associated with a virtual access point (VAP).

FIG. 5 depicts an example non-inheritance element 500 that may be included in a BSS profile to provide a list of management elements present in the multiple BSSID management frame 400 of the TxBSSID that are disabled and not inherited by the NonTxBSSID associated with the BSS profile. As shown in FIG. 5, the non-inheritance element 500 may include an element ID field 502, a length field 504, an element ID extension field 506, a list of element IDs field 508, and a list of element ID extensions field 510.

The element ID, length, and element ID extension fields have been previously described above, and are defined by the IEEE 802.11 specifications. For example, each management element that has an element ID that is less than or equal to a value of 254 is associated with an element ID and a length that are included in the element ID and length fields, respectively. When the element ID of a management element is greater than 254, the element ID extension field is used, according to the IEEE 802.11 specifications. In some implementations, the list of element IDs field 508 of the non-inheritance element 500 may include a list of the element ID values (e.g., each having a value of less than or equal to 254) that correspond to the management elements that are disabled and not inherited for the corresponding NonTxBSSID. For example, if the NonTxBSSID determines to disable three management elements (that are supported by the TxBSSID), the BSS profile associated with the NonTxBSSID may include a non-inheritance element 500 having list of element IDs field 508 that lists three different element ID values (e.g., each having a value of less than or equal to 254) corresponding to the three management elements that will be disabled for the NonTxBSSID. In some implementations, as shown in FIG. 5, the list of element IDs field 508 may include a length subfield 511 and an element ID list subfield 512. The element ID list subfield 512 may include a list of the element ID values corresponding to the management elements that will be disabled for the NonTxBSSID (such as three different element ID values). The length subfield 511 may be set to the number of elements listed in the element ID list subfield 512. For example, the length subfield 511 may be set to three if there are three different element ID values listed, or may be set to zero if there are no element ID values listed or the element ID list subfield is not present.

The list of element ID extensions field 510 of the non-inheritance element 500 may list additional management elements that do not have an element ID value that is less than 255 as defined in the IEEE 802.11 specification (including current and future versions of the IEEE 802.11 specification) and that are disabled and not inherited for the corresponding NonTxBSSID. In some implementations, as shown in FIG. 5, the list of element ID extensions field 510 may include the length subfield 521 and the element ID extension list subfield 522. The additional management elements that are listed in the list of element ID extensions field 510 may have an element ID value of 255 (as defined in the IEEE 802.11 specification, but may be another predefined value), and also an element ID extension value (e.g., a value less than or equal to 254) that may be included in the element ID extension list subfield 522. The length subfield 521 may be set to the number of elements listed in the element ID extension list subfield 522.

In some implementations, the non-inheritance element 500 of each BSS profile associated with a corresponding NonTxBSSID may be the last element of the BSS profile. The non-inheritance element 500 may be used as a delimiter to indicate the end of a BSS profile. For example, the non-inheritance element 500 may indicate the end of one BSS profile (such as the BSS profile 492 shown in FIG. 4) and the start of another BSS profile (such as the BSS profile 494). In some implementations, since the non-inheritance element 500 acts as a delimiter, the non-inheritance element 500 may be present in the BSS profile whether or not the element lists any management elements.

In some implementations, if the non-inheritance element 500 includes only one or more management elements that have an element ID value of less than or equal to 254, the non-inheritance element 500 may include the list of element IDs field 508, but may not include the list of element ID extensions field 510. If the non-inheritance element 500 includes only one or more of the additional management elements that have an element ID value of 255 (as defined in the IEEE 802.11 specification) and also an element ID extension value (e.g., a value less than or equal to 254), the non-inheritance element 500 may include the list of element ID extensions field 510, but may not include the list of element IDs field 508. If the non-inheritance element 500 includes one or more management elements that have an element ID value of less than or equal to 254 and also include one or more of the additional management elements that have an element ID value of 255 (as defined in the IEEE 802.11 specification) and also an element ID extension value, the non-inheritance element may include the list of element IDs field 508 and the list of element ID extensions field 510.

In some implementations, the non-inheritance element 500 may optionally include an element list separator field that separates the list of element IDs field 508 and the list of element ID extensions field 510. The element list separator field may also be used in conjunction with the list of element ID extensions field 510 to indicate that management elements are included in the list of element ID extensions field 510. In some implementations, when the element list separator field is present it may be set to a predefined value (such as a value of 255).

In some implementations, two or more types of non-inheritance elements may be optionally included in a BSS profile associated with a NonTxBSSID to indicate which management elements (that are supported by the TxBSSID) are disabled and not inherited for the NonTxBSSID. For example, a BSS profile associated with a NonTxBSSID may include one or more of (1) a legacy non-inheritance element, and (2) an extended non-inheritance element. The legacy non-inheritance element may be included in the BSS profile to list the one or more management elements that have an element ID value of less than or equal to 254, which may be referred to as the legacy management elements. Since the legacy non-inheritance element may be used to list the legacy management elements, the legacy non-inheritance element may only include the element ID field, the length field, the element ID extension field, and list of the element IDs field (and may not include the element list separator field and the list of element ID extensions field). The extended non-inheritance element may be included in the BSS profile to list one or more of the additional management elements that have an element ID value of 255 (as defined in the IEEE 802.11 specification) and also an element ID extension value (e.g., a value less than or equal to 254), which may be referred to as the non-legacy management elements or extended management elements. Since the extended non-inheritance element may be used to list the non-legacy management elements (or extended management elements), the extended non-inheritance element may only include the element ID field, the length field, the element ID extension field, the element list separator field (optional), and the list of element ID extensions field (and may not include the list of element IDs field). In some implementations, the conditional inheritance techniques that use one or more non-inheritance elements may be applied to BSSs that include both legacy and non-legacy STAs. In some implementations, the conditional inheritance technique that uses the null element may be applied to BSSs that include non-legacy STAs. It is further noted that although the disclosure includes some examples for conditional inheritance of management elements or features, conditional inheritance may also be applied to fields of the multiple BSSID management frame for global inheritance, BSS-based inheritance, and for BSS-based profile announcements or configurations of one or more fields of the multiple BSSID management frame.

As described above, the multiple BSSID elements 430 of the multiple BSSID management frame 400 may include the BSS profiles 492, 494, and 496 associated with the VAPs 152, 153, and 154, respectively. In some implementations, the WLAN apparatus 150 may indicate in the multi BSSID management frame 400 that it is advertising partial BSS profiles, and thus the BSS profiles 492, 494, and 496 may be partial BSS profiles. For example, the WLAN apparatus 150 may indicate that it is advertising partial BSS profiles by the presence or absence of a field in the multiple BSSID elements 430, or by setting an existing field in the multiple BSSID elements 430 to a particular value (e.g., setting a bit to 1 or 0). The field may be present in one of the existing elements (or a new element) in the multiple BSSID elements 430. For example, one of the reserved bits in a field of the existing Nontransmitted BSSID Capabilities element can be used or repurposed to indicate that it is advertising partial BSS profiles.

Figure 6:
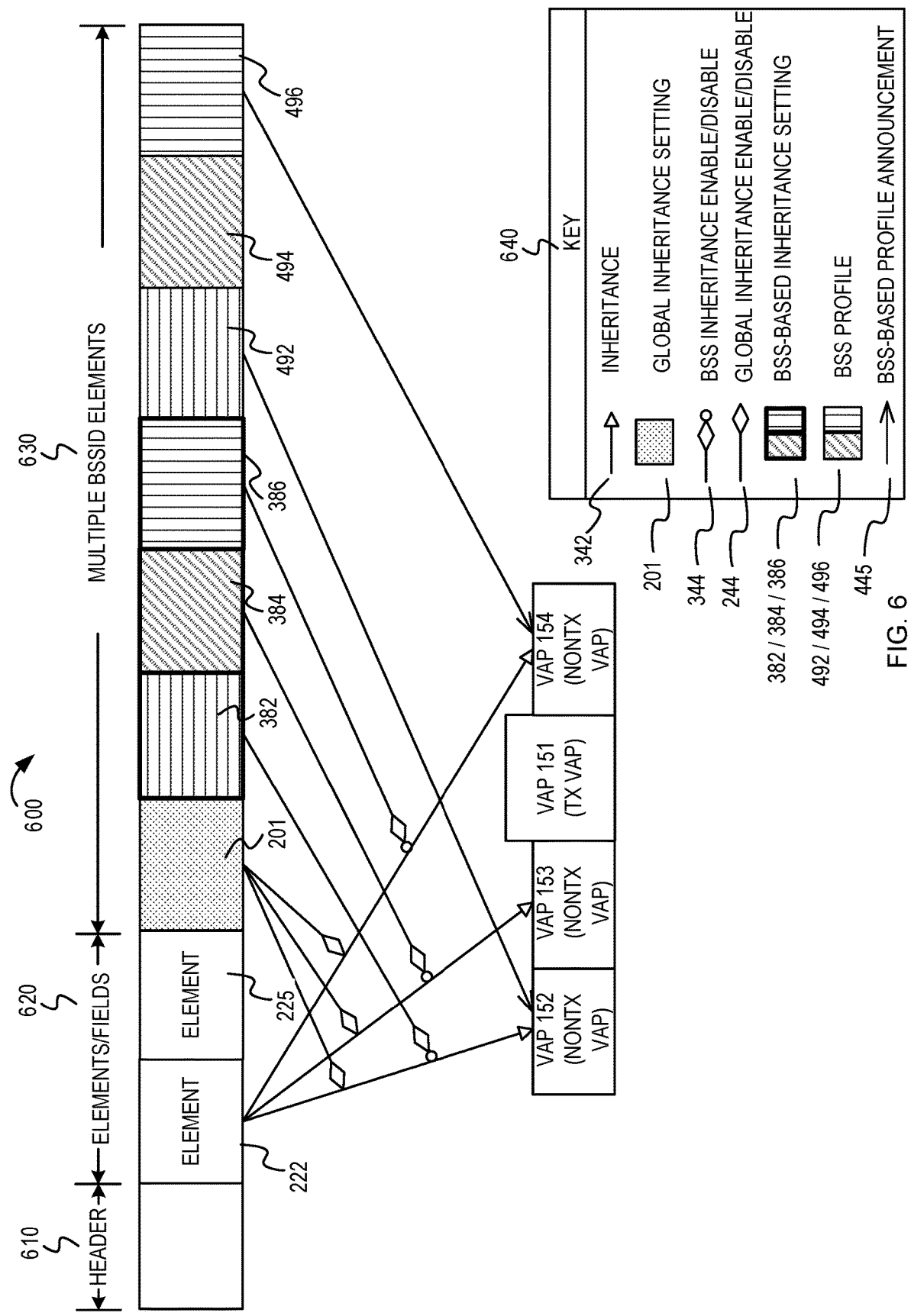
FIG. 6 depicts a conceptual diagram of an example multiple BSSID management frame that includes global inheritance settings, BSS-based inheritance settings, and BSS-based profile announcements and configurations.

FIG. 6 depicts a conceptual diagram of an example multiple BSSID management frame 600 that includes global inheritance settings (described in FIG. 2), BSS-based inheritance settings (described in FIG. 3), and BSS-based profile announcements and configurations (described in FIG. 4). The multiple BSSID management frame 600 may be a Beacon frame, a Probe Response frame, an Association Response frame, a Re-Association Response frame, or other types of management frames. The multiple BSSID management frame 600 may include a header 610, elements/fields 620, and multiple BSSID elements 630.

The elements/fields 620 may include elements, fields, features, capabilities, and other management information from the Tx VAP (e.g., VAP 151) that can be inherited by the NonTx VAPs (e.g., VAPs 152, 153, and 154). The multiple BSSID elements 630 may include the global inheritance settings 201 (described in FIG. 2), the BSS-based inheritance settings 382, 384, and 386 (described in FIG. 3), and the BSS profiles 492, 494, and 496 and BSS-based profile announcements and configurations (described in FIG. 4). As previously described, the global inheritance settings 201 and the BSS-based inheritance settings 382, 384, and 386 can determine the inheritance settings for the elements 222 and 225 (and various other elements).

As shown in FIG. 6, the WLAN apparatus 150 may implement a combination of the conditional inheritance techniques described in FIGS. 2-4. The WLAN apparatus 150 may also implement a subset of the conditional inheritance techniques described in FIGS. 2-4. For example, the conditional inheritance unit 155 and the multiple BSSID management unit 156 of the WLAN apparatus 150 may implement only the BSS-based inheritance settings 382, 384, and 386 (described in FIG. 3), and the BSS profiles 492, 494, and 496 and BSS-based profile announcements and configurations (described in FIG. 4).

In some implementations, the conditional inheritance techniques described in FIGS. 2-4 may have different priorities. The BSS profiles 492, 494, and 496 and BSS-based profile announcements and configurations that customize the BSS profiles 492, 494, and 496 may have the highest priority. For example, as described above, the BSS-based profile announcements and configurations can override any BSS-based or global inheritance settings. In one example, as shown in FIG. 6, if the element 222 is customized in the BSS profiles 492 and 496 (as shown by the BSS-based profile announcement arrows 445 in the key 640), the configurations of the element 222 in the BSS profiles 492 and 496 override any BSS-based or global inheritance settings. For example, if the element 222 is the Broadcast TWT parameter, since each of the VAPs may be associated with a different number and different types of STAs, the BSS-based profile announcement or configuration can be used to customize the Broadcast TWT parameter in each of the corresponding BSS profiles, which will override any BSS-based or global inheritance settings for the Broadcast TWT parameter. For example, with reference to FIG. 6, the BSS-based profile announcement or configuration can be used to customize the Broadcast TWT parameter in the BSS profiles 492 and 496. This overrides both the BSS-based inheritance settings 382 and 386, and the global inheritance settings 201.

The BSS-based inheritance settings 382, 384, and 386 may have the second highest priority and thus may override any conflicting global inheritance settings, as described previously. In one example, as shown in FIG. 6, if the BSS-based inheritance settings 384 has an inheritance setting for the element 222 (as shown by the BSS inheritance setting arrows 344), the BSS-based inheritance settings 384 overrides the global inheritance settings 201. The global inheritance settings 201 may have the lowest priority.

In some implementations, all of the VAPs within a multiple BSS set may inherit the same PHY/MAC capabilities, and modulation and coding scheme (MCS)/number of spatial streams (NSS). However, in some cases, different WLAN devices may want different bandwidths or NSS to limit the peak throughput for some NonTxBSSID VAPs. The BSS-based profile announcement or configuration can be used to customize the PHY/MAC capabilities, MCS, and NSS elements in a corresponding BSS profile, which will override any BSS-based or global inheritance settings for these elements. For example, with reference to FIG. 6, the BSS-based profile announcement or configuration can be used to customize the PHY/MAC capabilities, MCS, and NSS elements in the BSS profile 496 (not shown). This overrides the BSS-based inheritance setting 386 and the global inheritance settings 201 for these elements.

Figure 7:
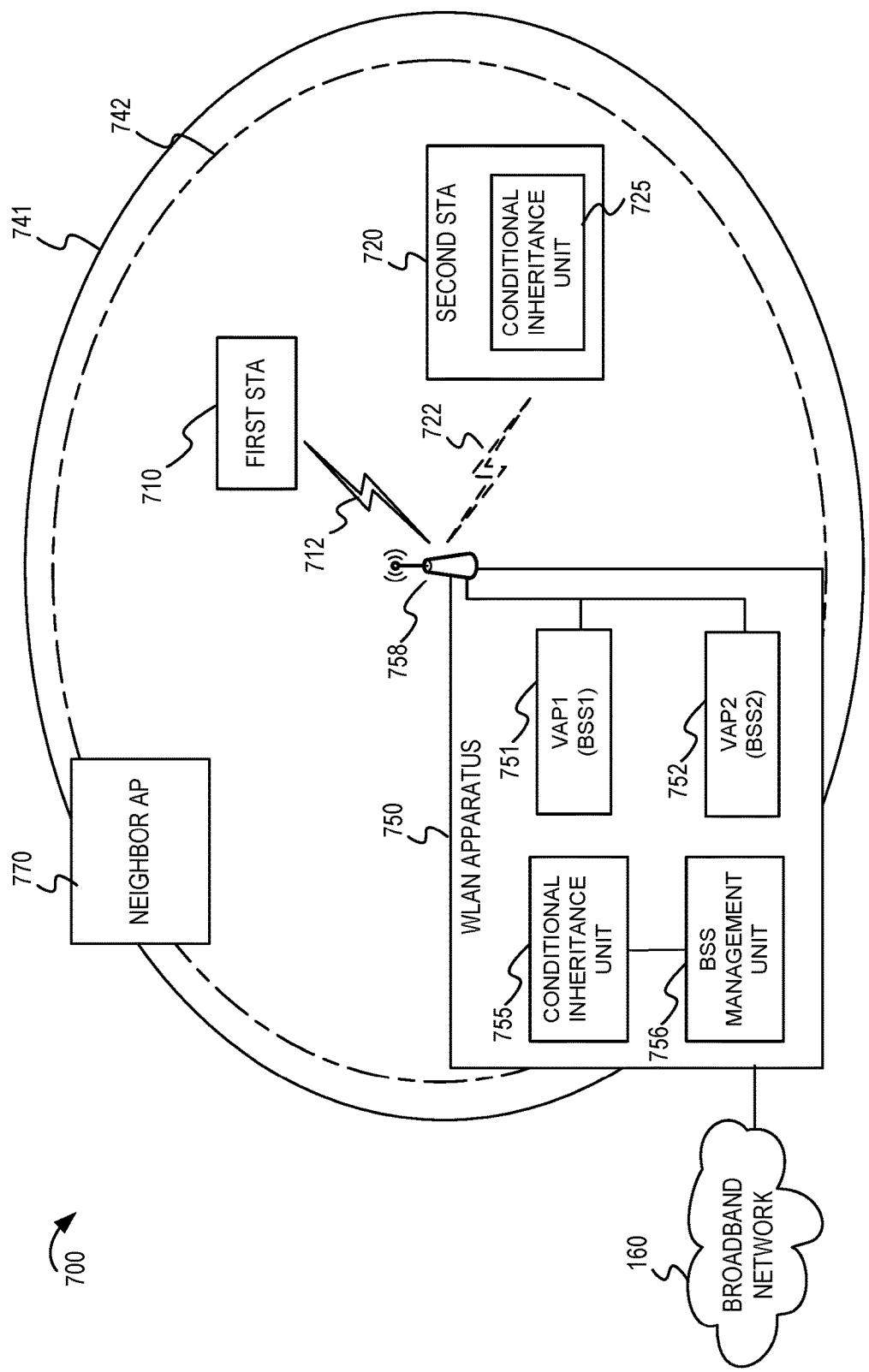
FIG. 7 depicts a system diagram of an example WLAN apparatus operating at least two co-located VAPs associated with at least two BSSs.

FIG. 7 depicts a system diagram of an example WLAN apparatus operating at least two co-located VAPs associated with at least two BSSs. The system diagram 700 includes a WLAN apparatus 750 which is communicatively coupled to a broadband network 160. The WLAN apparatus 750 may operate at least two co-located VAPs, such as a first VAP 751 (or VAP1) associated with a first BSS (or BSS1) and a second VAP 752 (or VAP 2) associated with a second BSS (or BSS2). The VAPs 751 and 752 may be located in the same physical WLAN apparatus (such as an AP). The first VAP 751 may provide a first coverage area 741, and the second VAP 752 may provide a second coverage area 742. For illustration purposes, the first coverage area 741 and the second coverage area 742 are shown as different size ovals in the diagram. However, the sizes of the coverage areas may be similar to each other and the shapes of the coverage areas may vary as a result of environmental obstructions or interference. The WLAN apparatus 750 may have one or more antennas 758. In some implementations, the VAPs 751 and 752 may share the same one or more antennas 758. In some implementations, the WLAN apparatus 750 may be an AP that implements the VAPs 751 and 752.

As shown in FIG. 7, the WLAN apparatus 750 may include a conditional inheritance unit 755 and a BSS management unit 756. In some implementations, the conditional inheritance unit 755 may support and implement a multiple BSSID mode, or may not support and implement a multiple BSSID mode. When the conditional inheritance unit 755 supports a multiple BSSID mode, the conditional inheritance unit 755 may enable or disable operation under the multiple BSSID mode. When operating under the multiple BSSID mode, the conditional inheritance unit 755 may implement the conditional inheritance (including non-inheritance) and other operations described in FIGS. 1-6. When the conditional inheritance unit 755 disables the multiple BSSID mode or does not support the multiple BSSID mode, the conditional inheritance unit 755 may operate under a co-located mode, as described herein in FIGS. 7-8. When the conditional inheritance unit 755 operates under the co-located mode, the conditional inheritance unit 755 and the BSS management unit 756 may implement similar conditional inheritance (including non-inheritance) operations as described above in FIGS. 1-6 for the multiple BSSID mode. The conditional inheritance unit 755 may determine the capabilities, features, and other management information of the BSSs associated with the VAPs of the WLAN apparatus, and implement various conditional inheritance settings. For example, one of the VAPs may advertise conditional inheritance (including non-inheritance) for another VAP based on the management information (such as management elements) associated with the VAPs that was obtained by the conditional inheritance unit 755. For example, when the first VAP 751 associated with the first BSS advertises the management elements and other features or capabilities of the second VAP 752 associated with the second BSS, the first VAP 751 may advertise the management elements that are inherited by the second VAP 752, the management elements that are customized for the second VAP 752, and the management elements that are not inherited by the VAP 752. As described in this disclosure, management elements also may be referred to as elements or information elements.

The BSS management unit 756 may manage the BSS capabilities for the WLAN apparatus 750, including operating the VAPs of the WLAN apparatus 750 (such as the VAPs 751 and 752), obtaining the conditional inheritance settings determined by the conditional inheritance unit 755, and generating a management frame based on the conditional inheritance settings. In some implementations, the VAPs 751 and 752, the conditional inheritance unit 755, and the BSS management unit 756 may be included in a communication module (not shown) of the WLAN apparatus 750 and may be implemented by one or more processors of the communication module. The communication module may include other network interface related components, such as one or more modems, analog front end (AFE), and the one or more antennas 758.

In some implementations, the first VAP associated with the first BSS and the second VAP associated with the second BSS may operate in the same frequency band or in different frequency bands. For example, both the first BSS and the second BSS may operate in the same channel in the same frequency band (such as the 2.4 GHz, 5 GHz, 6 GHz, or 60 GHz frequency band). In another example, one of the BSSs may operate in a first frequency band (such as the 2.4 GHz or 5 GHz frequency band), and another BSS may operate in a second frequency band (such as the 6 GHz frequency band). Each VAP associated with a BSS may have different wireless associations with client stations (which may also be referred to as stations (STAs)). A STA can establish a wireless association (also referred to as a wireless link, wireless connection, or the like) with a VAP to access the broadband network 160 via the WLAN apparatus 150. For example, as shown in FIG. 7, the first STA 710 may have a first wireless association 712 with the first BSS (corresponding to the first VAP 751), and the second STA 720 may have a second wireless association 722 with a second BSS (corresponding to the second VAP 752).

In some implementations, the first VAP 751 associated with the first BSS may advertise the management elements of the second VAP 752 associated with the second BSS. The first VAP 751 and the second VAP 752 may be operating in the same frequency band or in different frequency bands. The first VAP 751 may generate and broadcast a management frame (such as a Beacon frame or Probe Response frame) that specifies the management elements for the first BSS, and also advertises inheritance information (including non-inheritance information) for the second BSS associated with the second VAP 752. Similar to the aspects described in FIGS. 1-6, the first VAP may advertise the management elements of the first BSS that are inherited by the second VAP 752 associated with the second BSS, the management elements that are customized for the second VAP 752, and the management elements that are not inherited by the VAP 752. For example, the management elements of the first BSS that are inherited by the second BSS may be referred to as a global inheritance setting, since both the first and second BSSs utilize those management elements. The management elements of the first BSS that are not inherited by the second BSS may be referred to as a non-inheritance setting, since it disables the management element or feature for the second BSS (and override any inheritance settings for that management element). As further described in this disclosure, the non-inheritance setting for the second BSS may be specified in a non-inheritance element included in the management frame. Furthermore, the management elements of the first BSS that are customized for the second BSS may be referred to as a BSS-based inheritance setting, since the management elements are customized for the corresponding BSS.

Figure 8:
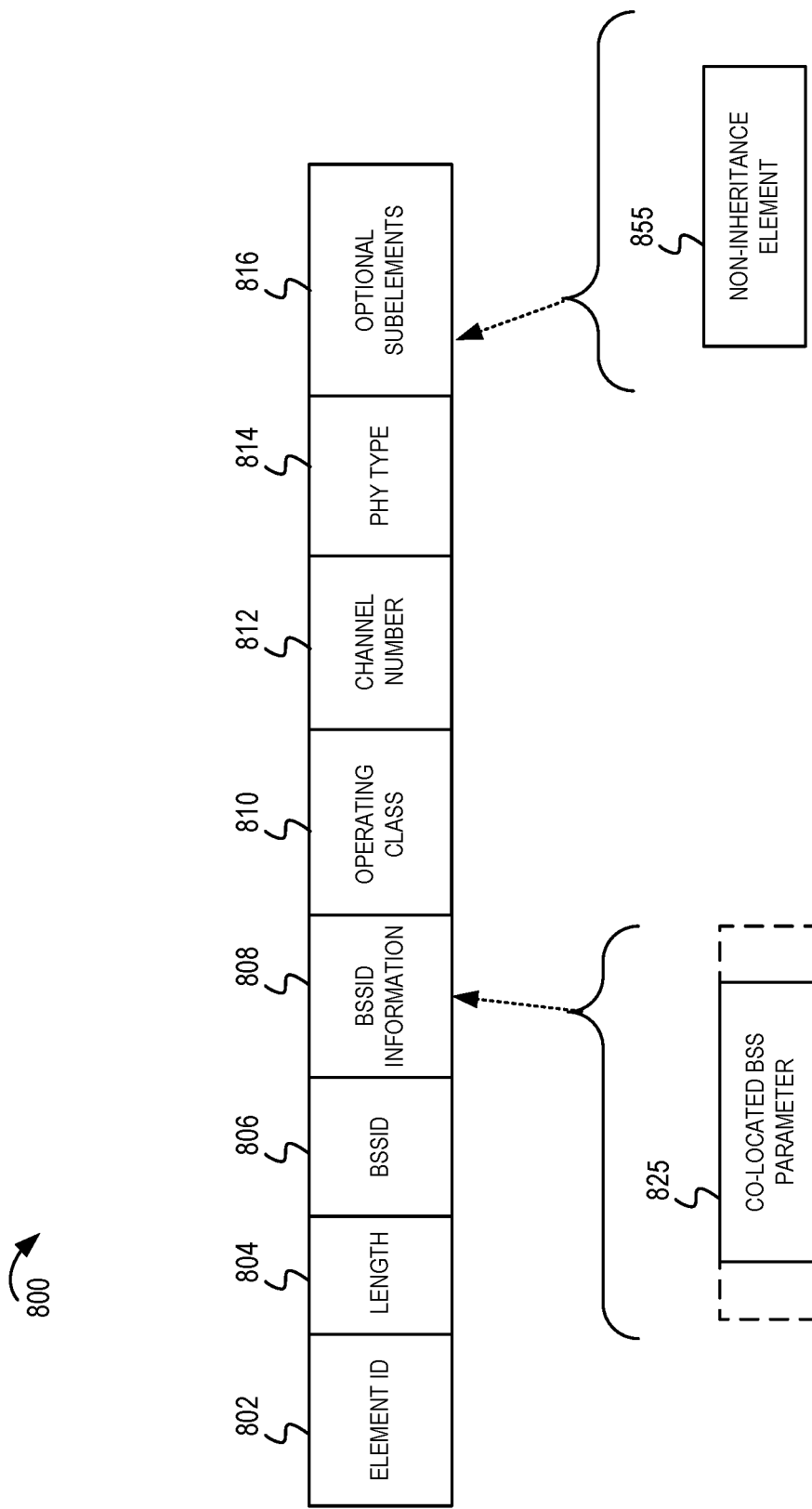
FIG. 8 depicts an example neighbor report element for advertising the presence and inheritance information of a co-located VAP or a neighbor AP.

In some implementations, the management frame generated and transmitted by the first VAP 751 associated with the first BSS may include a neighbor report element (or other inheritance-related element) that may indicate the presence of the second VAP 752 and provide inheritance (including non-inheritance) information regarding the second VAP 752 associated with the second BSS, as will be further described in FIG. 8. For example, the neighbor report element may include a non-inheritance element (such as the non-inheritance element shown in FIG. 5) that specifies the management element or feature that are disabled for the second BSS (and override any inheritance settings for these management elements). In some implementations, the non-inheritance element may be a sub-element of the neighbor report element, or the neighbor report element may include a BSS profile for the second BSS (or other similar BSS-specific information) that includes the non-inheritance element, as described further in FIG. 8. The neighbor report element may also include additional inheritance information that specifies the management elements that are inherited from the first BSS, and the management elements that are customized for the second BSS, either as sub-elements of the neighbor report element or within the BSS profile of the second BSS. In some implementations, the conditional inheritance unit 755 and the BSS management unit 756 of the WLAN apparatus 750 may prepare and configure the neighbor report element and the non-inheritance element, and include the neighbor report element and the non-inheritance element in the management frame.

In some implementations, each of the STAs (such as STAs 710 and 720) may include a conditional inheritance unit to process the management frame received from the WLAN apparatus 750 (such as a Beacon frame or a Probe Response frame). For example, as shown in FIG. 7, the second STA 720 may include a conditional inheritance unit 725. The STA 710 also may include a conditional inheritance unit; however, the conditional inheritance unit is not shown in FIG. 7 for simplicity. In some implementations, after receiving the management frame, the conditional inheritance unit 725 of the second STA 720 may process the management frame to determine which management elements are inherited and which are not inherited, for example. The conditional inheritance unit 725 may parse and process some of the management elements related to inheritance (including non-inheritance) associated with the second BSS to determine which management elements are inherited from the first BSS, which management elements are not inherited or disabled, and which management elements are customized for the second BSS. After processing the management frame, the second STA 720 may communicate with the VAP 752 of the WLAN apparatus 750.

In some implementations, at least one of the VAPs of the WLAN apparatus 750 (such as the first VAP 751) also may advertise presence and inheritance (including non-inheritance) information for a neighboring AP that is not physically co-located within the same apparatus as the first and second VAPs 751 and 752. For example, the first VAP 751 may advertise inheritance information for a neighbor AP 770, which may be a neighbor AP in the vicinity of the WLAN apparatus 750 and may be within the same extended service set (ESS) as the WLAN apparatus 750. In some implementations, similar to advertising inheritance information about a co-located VAP, the first VAP 751 may advertise inheritance information for the neighbor AP 770 using a neighbor report element, as described further in FIG. 8. In some implementations, the WLAN apparatus 750 may determine management information (such as management elements and other features) associated with a third BSS of the neighbor AP 770. For example, the WLAN apparatus 750 and the neighbor AP 770 may periodically communication to exchange management information (and other information). The conditional inheritance unit 755 and the BSS management unit 756 of the WLAN apparatus 750 may prepare and configure the neighbor report element and the non-inheritance element, and include the neighbor report element and the non-inheritance element in the management frame.

FIG. 8 depicts an example neighbor report element 800 for advertising the presence and inheritance information of a co-located VAP or a neighbor AP. The neighbor report element 800 may be used by an AP (such as the first VAP 751 of the WLAN apparatus 750 shown in FIG. 7) to advertise information associated with a co-located neighbor AP (such as the second VAP 752 of FIG. 7) or a stand-alone neighbor AP (such as the neighbor AP 770 of FIG. 7, which is not a co-located AP) to other devices (such as STAs) in a WLAN.

In some implementations, each of the VAPs (such as VAPs 751 and 752) operating in the WLAN apparatus 750 may transmit a neighbor report element. A neighbor report element may be transmitted periodically in beacon frames or may be transmitted at any time via other management frames (such as probe response or (re)association response frames). As shown in FIG. 8, the neighbor report element 800 may include an element ID 802, a length 804, a BSSID 806, BSSID information 808, an operating class 810, a channel number 812, a PHY type 814, and optional sub-elements 816. In some implementations, the BSSID information 808 may include a co-located BSS parameter 825. The BSSID information 808 may include one or more additional parameters that are not shown for simplicity. In some implementations, the neighbor report element 800 may include different fields, additional fields, or fewer fields than the fields shown in FIG. 8. The element ID 802, the length 804, the BSSID 806, the BSSID information 808, the operating class 810, the channel number 812, the PHY type 814, and the optional sub-elements 816 may be defined according to general procedures (for example, as defined by the family of IEEE 802.11 wireless standards).

In some implementations, the first VAP 751 of the WLAN apparatus 750 may generate and transmit a management frame that includes the neighbor report element 800 to advertise inheritance (including non-inheritance) information associated with the second VAP 752 or the neighbor AP 770. In some implementations, the co-located BSS parameter 825 may be a bit or a field that indicates whether the neighbor AP identified in the neighbor report element is a co-located VAP that is operating in the same physical device (such as the WLAN apparatus 750) as the first VAP 751. For example, when the co-located BSS parameter 825 includes a value of '1', the co-located BSS parameter 825 may indicate that the neighbor AP is a co-located VAP (such as the VAP 752). When the co-located BSS parameter 825 includes a value of '0', the co-located BSS parameter 825 may indicate that the neighbor AP is not co-located in the same physical device, and thus it is a separate AP in the WLAN (such as neighbor AP 770). The bit or field associated with the co-located BSS parameter 825 may be an existing reserved bit or field, a repurposed bit or field, or a new bit or field.

In some implementations, the optional sub-elements 816 may include a non-inheritance element 855 and optionally include a BSS profile 857. As described above, the non-inheritance element 855 may indicate the management elements associated with the first BSS that are disabled (or not inherited) for the second BSS associated with the second VAP 752. The non-inheritance element 855 may indicate the management elements associated with the first BSS that are disabled (or not inherited) for a third BSS associated with the neighbor AP 770. In some implementations, the non-inheritance element 855 may have the same (or a similar) structure and information as the non-inheritance element 500 shown in FIG. 5. In some implementations, the non-inheritance element 855 may be part of a BSS profile included in the optional sub-elements 816. The BSS profile may indicate the management elements of the first BSS that are inherited by the second BSS (or third BSS), the management elements that are customized for the second BSS (or third BSS), and the non-inheritance element 855. In some implementations, the BSS profile may include the non-inheritance element 855 and a list of management elements that are customized for the second BSS (or Third BSS).

Figure 9:
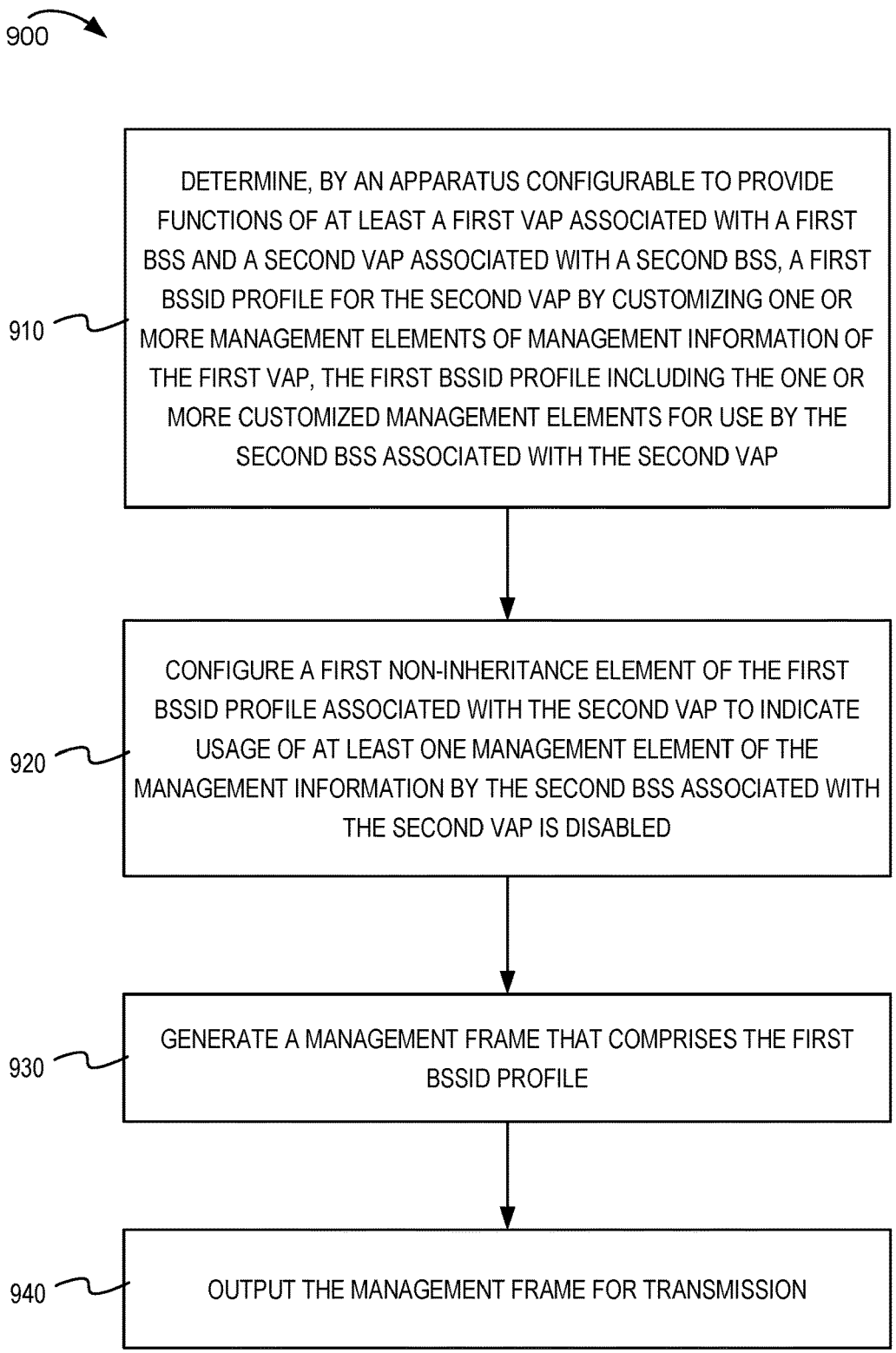
FIG. 9 shows an example flowchart of an apparatus implementing one or more of the conditional inheritance techniques.

FIG. 9 shows an example flowchart 900 of an apparatus implementing one or more of the conditional inheritance techniques. The apparatus may be a WLAN apparatus, such as an AP. The apparatus may be configurable to provide functions of multiple VAPs respectively corresponding to multiple BSSs. The multiple VAPs may include a first VAP corresponding to a first BSS and a second VAP corresponding to a second BSS. In some implementations, the multiple VAPs and the associated BSSs may be part of a multiple BSSID set. For example, a first BSSID of the first BSS associated with the first VAP may be a transmitted BSSID of the multiple BSSID set, and a second BSSID of the second BSS associated with the second VAP may be a nontransmitted BSSID of the multiple BSSID set. In some implementations, the first VAP and the second VAP may be co-located VAPs of the apparatus that operate in the same frequency band or in a different frequency band.

At block 910, the apparatus may determine a first BSSID profile for the second VAP by customizing one or more management elements of management information of the first VAP. The first BSSID profile may include the one or more customized management elements for use by the second BSS associated with the second VAP (as described in FIG. 4). In some implementations, the apparatus may configure a field of a customized management element of the one or more customized management elements of the first BSSID profile to disable usage of the customized management element by the second BSS associated with the second VAP.

At block 920, the apparatus may configure a first non-inheritance element of the first BSSID profile associated with the second VAP to indicate usage of at least one management element of the management information by the second BSS associated with the second VAP is disabled. In some implementations, the apparatus may configure the first non-inheritance element of the first BSSID profile by listing information associated with the at least one management element in the first non-inheritance element (as described above in FIG. 4). For example, the non-inheritance element of the first BSSID profile may list one or more management elements that will be disabled for the second BSS, and that will not inherit the BSS-based or global inheritance settings. In some implementations, the apparatus may configure a second non-inheritance element of a second BSSID profile associated with a third VAP of the multiple VAPs to indicate usage of at least one management element of the management information by a third BSS associated with the third VAP is disabled.

At block 930, the apparatus may generate a management frame that includes the first BSSID profile. In some implementations, the multiple BSSID management frame may include additional information, such as the second BSSI profile associated with a third VAP.

At block 940, the apparatus may output the management frame for transmission. In some implementations, the multiple BSSID management frame may be a beacon frame or a probe response frame, and the management information may include one or more of management elements, fields, features, and capabilities.

In some implementations, the apparatus may determine a first BSS-based inheritance setting that indicates one or more management elements of the management information of the first VAP that will be used by the second VAP. The first BSS-based inheritance setting may be determined based on a first inheritance configuration of the management information of the first VAP, where the first inheritance configuration is supported by the second VAP. For example, the apparatus may determine the BSS-based inheritance setting 382, as described above in FIGS. 3 and 6.

In some implementations, the apparatus may determine a second BSS-based inheritance setting may indicate one or more management elements of the management information that will be used by a third VAP of the multiple VAPs. The second BSS-based inheritance setting may be determined based on a second inheritance configuration of the management information, where the second inheritance configuration is supported by the third VAP. For example, the WLAN apparatus may determine the BSS-based inheritance setting 384, as described above in FIGS. 3 and 6.

In some implementations, the apparatus may generate the multiple BSSID management frame based, at least in part, on the first BSS-based inheritance setting and the second BSS-based inheritance setting. For example, the WLAN apparatus may generate the multiple BSSID management frame based at least one the BSS-based inheritance setting 382 and the BSS-based inheritance setting 384.

In some implementations, the apparatus may determine a global inheritance setting indicating management elements of the management information of the first VAP. The global inheritance setting may be determined based on a global inheritance configuration of the management information, where the global inheritance configuration is supported by the second VAP and any other VAP of the multiple VAPs (as described in FIG. 3).

In some implementations, when the first and second VAPs are co-located VAPs, the apparatus may prepare a management frame associated with the first VAP and configure a neighbor report element for advertising a presence of the second VAP associated with the second BSS. The neighbor report element may include the first non-inheritance element.

In some implementations, the apparatus may determine management information associated with a neighbor AP associated with a third BSS. The neighbor AP may not be co-located with the first and second VAPs of the apparatus. The apparatus may prepare a management frame associated with the first VAP and configure a neighbor report element for advertising a presence of the neighbor AP associated with the third BSS. The neighbor report element may include a non-inheritance element associated with the neighbor AP to indicate usage of at least one management element of the management information by the third BSS associated with the neighbor AP is disabled.

As described above in FIGS. 1-6, the multiple BSSID management frame may be generated based on one or more of the conditional inheritance techniques described above. For example, the multiple BSSID management frame may be generated by applying the first BSS-based inheritance setting for the second VAP, and the second BSS-based inheritance setting for the third VAP. Also, the multiple BSSID management frame may be generated by configuring a first BSSID profile for the second VAP that includes the management information that is customized for second VAP, and configuring a second BSSID profile for the third VAP that includes the management information that is customized for third VAP. Furthermore, the multiple BSSID management frame may be generated by applying a global inheritance setting for the WLAN apparatus that indicates management information that will be inherited from the management information of the first VAP by the second VAP, the third VAP, and any additional VAPs that are implemented by the WLAN apparatus. Thus, the multiple BSSID management frame may be generated based on one or more of these conditional inheritance techniques, which also follow the priority rules described above in FIG. 6.

Figure 10:
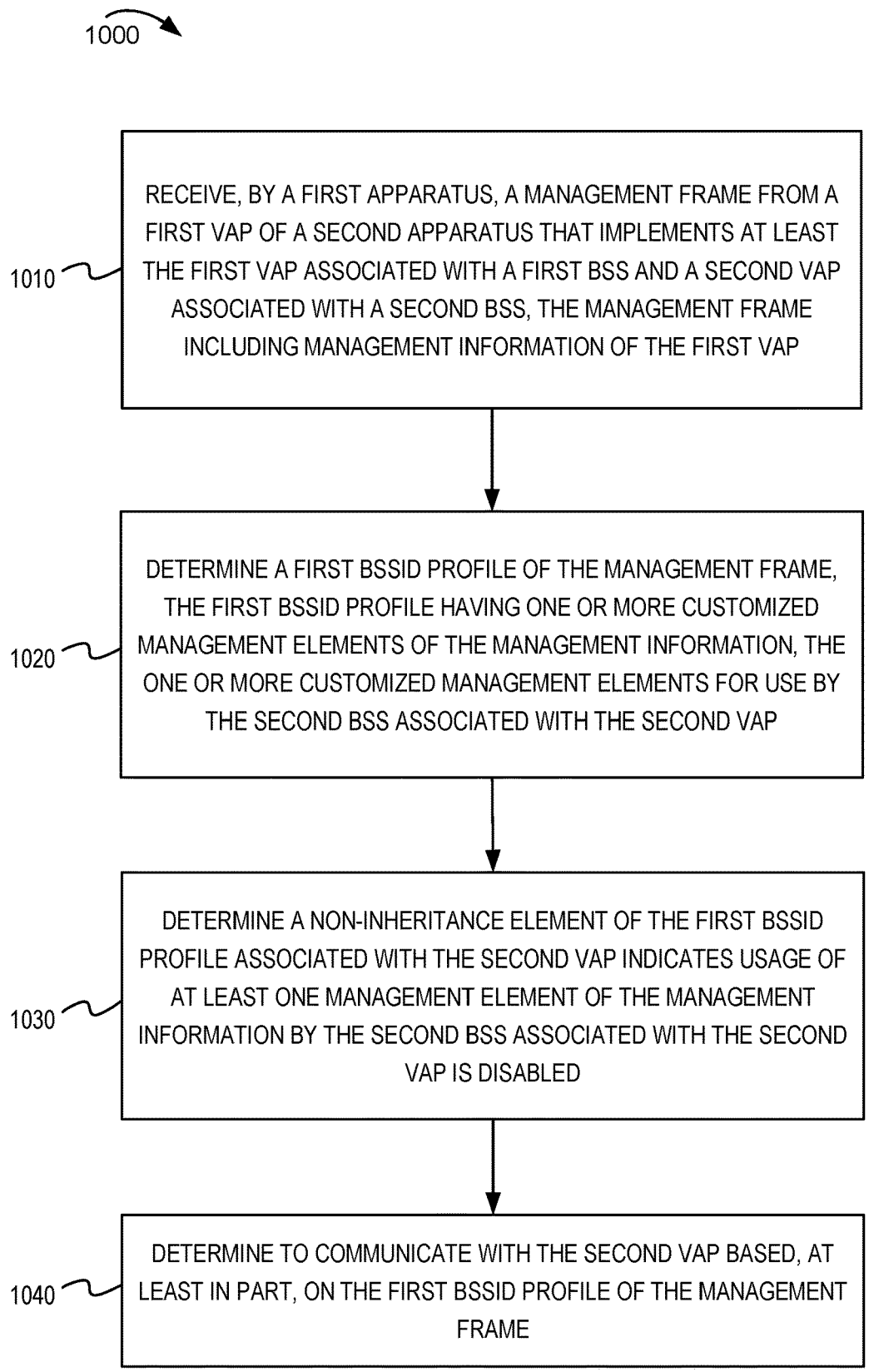
FIG. 10 shows an example flowchart of an apparatus receiving a multiple BSSID management frame that implements one or more conditional inheritance techniques.

FIG. 10 shows an example flowchart of an apparatus receiving a multiple BSSID management frame that implements conditional inheritance techniques. The apparatus may be a WLAN apparatus, such as a STA.

At block 1010, the apparatus may receive a management frame from a first VAP of a second apparatus that implements at least the first VAP associated with a first BSS and a second VAP associated with a second BSS. The management frame may include management information. In some implementations, the multiple VAPs of the second apparatus and the associated BSSs may be part of a multiple BSSID set. For example, a first BSSID of the first BSS associated with the first VAP may be a transmitted BSSID of the multiple BSSID set, and a second BSSID of the second BSS associated with the second VAP may be a nontransmitted BSSID of the multiple BSSID set. In some implementations, the first VAP and the second VAP may be co-located VAPs of the second apparatus that operate in the same frequency band or in a different frequency band.

At block 1020, the apparatus may determine a first BSSID profile of the management frame. The first BSSID profile may include one or more customized management elements of the management information. The one or more customized management elements may be for use by the second BSS associated with the second VAP. In some implementations, the apparatus may determine a field of a customized management element of the one or more customized management elements of the first BSSID profile indicates to disable usage of the customized element by the second BSS associated with the second VAP. For example, the customized management elements may include at least one customized management element that will be used by the second BSS, and at least one customized management element having a field that indicates to disable usage of that element for the second BSS (as described in FIG. 4).

At block 1030, the apparatus may determine a non-inheritance element of the first BSSID profile associated with the second VAP indicates usage of at least one management element of the management information by the second BSS associated with the second VAP is disabled. For example, the non-inheritance element of the first BSSID profile may list one or more management elements that will be disabled for the second BSS, and that will not inherit the BSS-based or global inheritance settings (as described in FIG. 4).

At block 1040, the apparatus may determine to communicate with the second VAP based, at least in part, on the first BSSID profile of the management frame.

In some implementations, the apparatus may determine a first BSS-based inheritance setting of the management frame. The first BSS-based inheritance setting may indicate one or more management elements of the management information that are supported by the second VAP (as described in FIG. 3).

Figure 11:
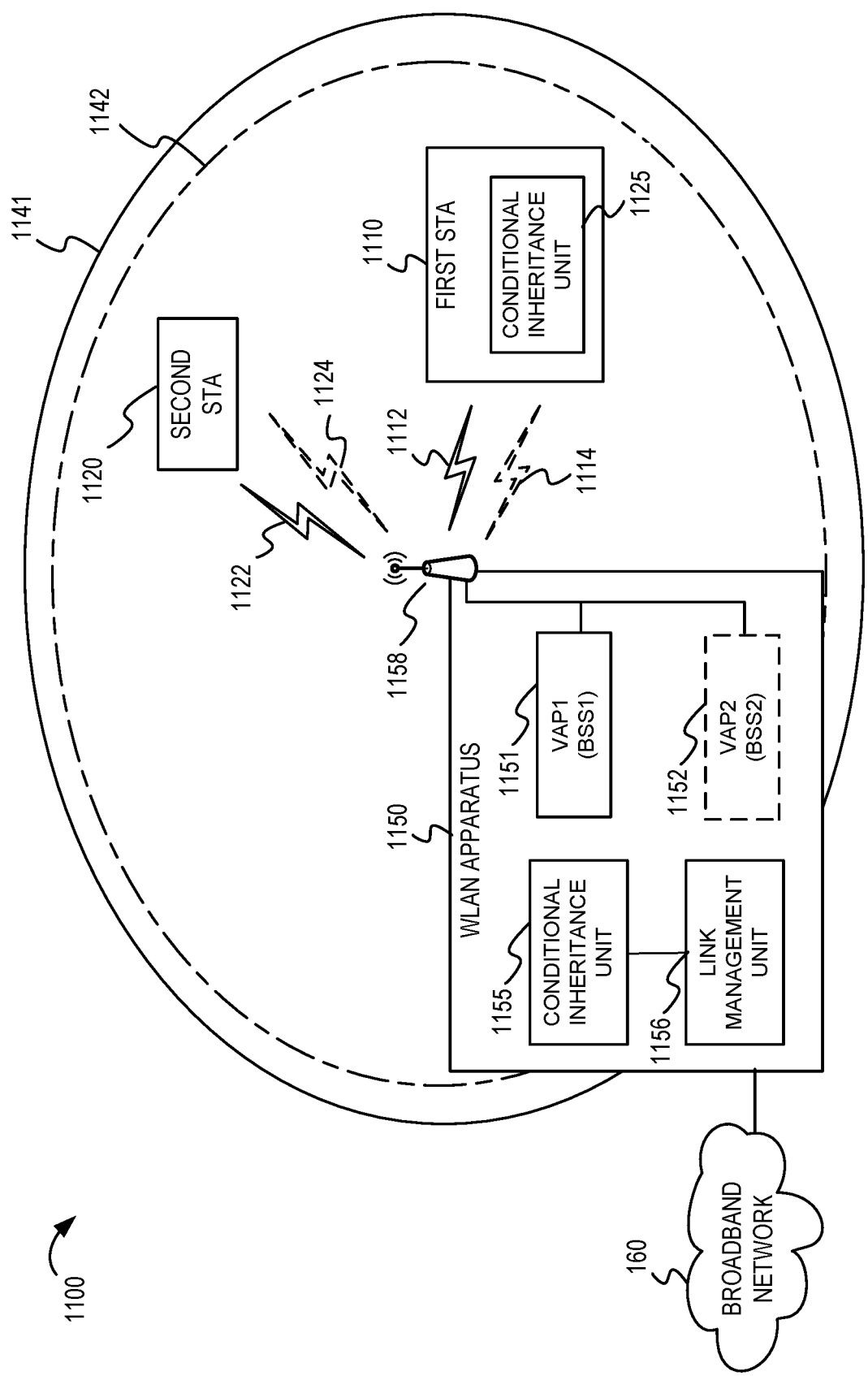
FIG. 11 depicts a system diagram of an example WLAN apparatus configured to implement multi-link aggregation and conditional inheritance for a BSS.

FIG. 11 depicts a system diagram of an example WLAN apparatus configured to implement multi-link aggregation and conditional inheritance for a BSS. The system diagram 1100 includes a WLAN apparatus 1150 which is communicatively coupled to a broadband network 160. The WLAN apparatus 1150 may provide functions of an access point (AP), such as operating a first VAP 1151 (or VAP1) associated with a first BSS (or BSS1). The WLAN apparatus 1150 may support protocols defined by family of IEEE 802.11 wireless standards, such as the IEEE 802.11ax and 802.11be extremely high throughput (EHT) standard specifications. In some implementations, the WLAN apparatus 1150 may operate a single AP that implements multi-link aggregation with conditional inheritance for its BSS. In some implementations, the WLAN apparatus 1150 may optionally operate one or more additional VAPs, such as a second VAP 1152 (or VAP 2) associated with a second BSS (or BSS2). At least one of the VAPs 1151 and 1152 may implement multi-link aggregation with conditional inheritance for their corresponding BSS. The first VAP 1151 may provide a first coverage area 1141, and the second VAP 1152 may provide a second coverage area 1142. For illustration purposes, the first coverage area 1141 and the second coverage area 1142 are shown as different size ovals in the diagram. However, the sizes of the coverage areas may be similar to each other and the shapes of the coverage areas may vary as a result of environmental obstructions or interference. The WLAN apparatus 1150 may have one or more antennas 1158. In some implementations, the VAPs 1151 and 1152 may share the same one or more antennas 1158.

As shown in FIG. 11, the WLAN apparatus 1150 may include a conditional inheritance unit 1155 and a link management unit 1156. In some implementations, the conditional inheritance unit 1155 and the link management unit 1156 may support and implement multi-link aggregation. Multi-link aggregation allows a single AP (such as the first VAP 1151) to establish and manage two or more communication links (such as the communication links 1112 and 1114) concurrently in different frequency bands in a single BSS (such as the first BSS). For example, the VAP 1151 may associate with and establish the first communication link 1112 using a first frequency band (such as the 2.4 GHz frequency band) with a first STA 110 in the first BSS, and may concurrently establish a second communication link 1114 with the first STA 110 in the first BSS. The first communication link 1112 that uses the first frequency band may be used to perform the association process with the STA 110, and transmit management frames to the STA 110 during and after association. Thus, the first communication link 1112 may be referred to as the primary communication link, anchor communication link, home communication link, or management communication link. The first frequency band (or channel) may be referred to as the primary communication band (or channel), anchor communication band (or channel), home communication band (or channel), or management communication band (or channel). The VAP 1151 may use the first communication link 1112 to transmit management frames that advertises the multi-link capabilities of the VAP 1151 to the STA 110. For example, the VAP 1151 may advertise that it is capable of establishing the second communication link 1114 using a second frequency band with the first STA 110 in the first BSS, and may indicate the management information (such as management elements and other features) and inheritance information associated with the second communication link 1114. The second communication link 1114 may be referred to as a secondary communication link, alternate communication link, or candidate communication link. The second frequency band may be referred to as a secondary frequency band, alternate frequency band, or candidate frequency band. When the STA 110 supports multi-link aggregation, the STA 110 may determine whether it is capable of establishing the second communication link 1114 based on the management and inheritance information received from the VAP 1151, as will be further described herein. If so, the VAP 1151 and the STA 110 may exchange one or more communications to enable the second communication link 1114 without having to go through the association process for the second communication link 1114. After establishing the second communication link 1114, the VAP 1151 and the STA 110 may transmit data packets via the first communication link 1112 and the second communication link 1114. For example, if the VAP 1151 and the STA 110 of the first BSS are exchanging data packets associated with an application (such as a file download), the VAP 1151 may transmit some of the packets via the first communication link 1112 and other packets via the second communication link 1114.

In some implementations, for a multi-link aggregation mode, the conditional inheritance unit 1155 and the link management unit 1156 may implement similar conditional inheritance (including non-inheritance) operations as described above in FIGS. 1-10 for the multiple BSSID mode and the co-located mode. The conditional inheritance unit 1155 may determine the capabilities, features, and other management information of both the available and established communication links (such as the first and second communication links 1112 and 1114) and implement various conditional inheritance settings. For example, the VAP 1151 may advertise conditional inheritance (including non-inheritance) for a second communication link 1114 in a management frame transmitted in the first communication link 1112 based on the management information associated with the first communication link 1112 and the second communication link 1114. For example, when the first VAP 1151 transmits a management frame via the first communication link 1112 providing management information (such as management elements) for the first communication link 1112, the first VAP 1151 also may indicate which of the management elements of the first communication link 112 that are inherited by the second communication link 1114, the management elements that are customized for the second communication link 1114 (such as channel or band specific elements), and the management elements that are not inherited by the second communication link 1114. As described in this disclosure, management elements also may be referred to as elements or information elements.

In some implementations, the link management unit 1156 may manage the link capabilities for the WLAN apparatus 1150, including operating the one or more VAPs of the WLAN apparatus 1150 (such as the VAP 1151 and optionally the VAP 1152) and the corresponding communication links, obtaining the conditional inheritance settings determined by the conditional inheritance unit 1155, and generating a management frame based on the conditional inheritance settings. In some implementations, the VAPs 1151 and 1152, the conditional inheritance unit 1155, and the link management unit 1156 may be included in a communication module (not shown) of the WLAN apparatus 1150 and may be implemented by one or more processors of the communication module. The communication module may include other network interface related components, such as one or more modems, analog front end (AFE), and the one or more antennas 1158.

In some implementations, the first communication link 1112 may use a first frequency band, such as the 2.4 GHz, 5 GHz, 6 GHz, or 60 GHz frequency band. The second communication link 1114 may use a different frequency band than the first communication link. For example, the first communication link 1112 may use the 2.4 GHz frequency band, and the second communication link 1114 may the 5 GHz frequency band. In another example, the first communication link 1112 may use the 5 GHz frequency band, and the second communication link 1114 may the 6 GHz frequency band. In some implementations, the first VAP 1151 may generate and broadcast management frames (such as a Beacon frame or Probe Response frame) via the first communication link 1112 to indicate the management elements associated with the first communication link 1112 and also advertise inheritance information (including non-inheritance information) of the second communication link 1114. For example, similar to the conditional inheritance aspects described in FIGS. 1-10, the first VAP 1151 may advertise the management elements of the first communication link 1112 that are inherited by the second communication link 1114, the management elements that are customized for the second communication link 1114, and the management elements that are not inherited by the second communication link 1114. For example, the management elements of the first communication link 1112 that are inherited by the second communication link 1114 may be referred to as a global inheritance setting, since both the first and second communication links 1112 and 1114 utilize those management elements. The management elements of the first communication link 1112 that are not inherited by the second communication link 1114 may be referred to as a non-inheritance setting, since it disables the management element or feature for the second communication link 1114 (and override any inheritance settings for that management element). As further described in this disclosure, the non-inheritance setting for the second communication link 1114 may be specified in a non-inheritance element included in the management frame. Furthermore, the management elements of the first communication link 1112 that are customized for the second communication link 1114 may be referred to as a link-based inheritance setting (or link-specific inheritance setting), since the management elements are customized for the corresponding communication link. In some implementations, in order to reduce overhead from beacon and other management frames, the first communication link 1112 may be used to transmit beacons and other management frames for both the communication links of the first BSS, and the second communication link 1114 may not transmit beacons and other management frames. In some implementations, the second communication link 1114 may be used to transmit certain special management frames that have low overhead, such as fast initial link setup (FILS) discovery frames.

Figure 12:
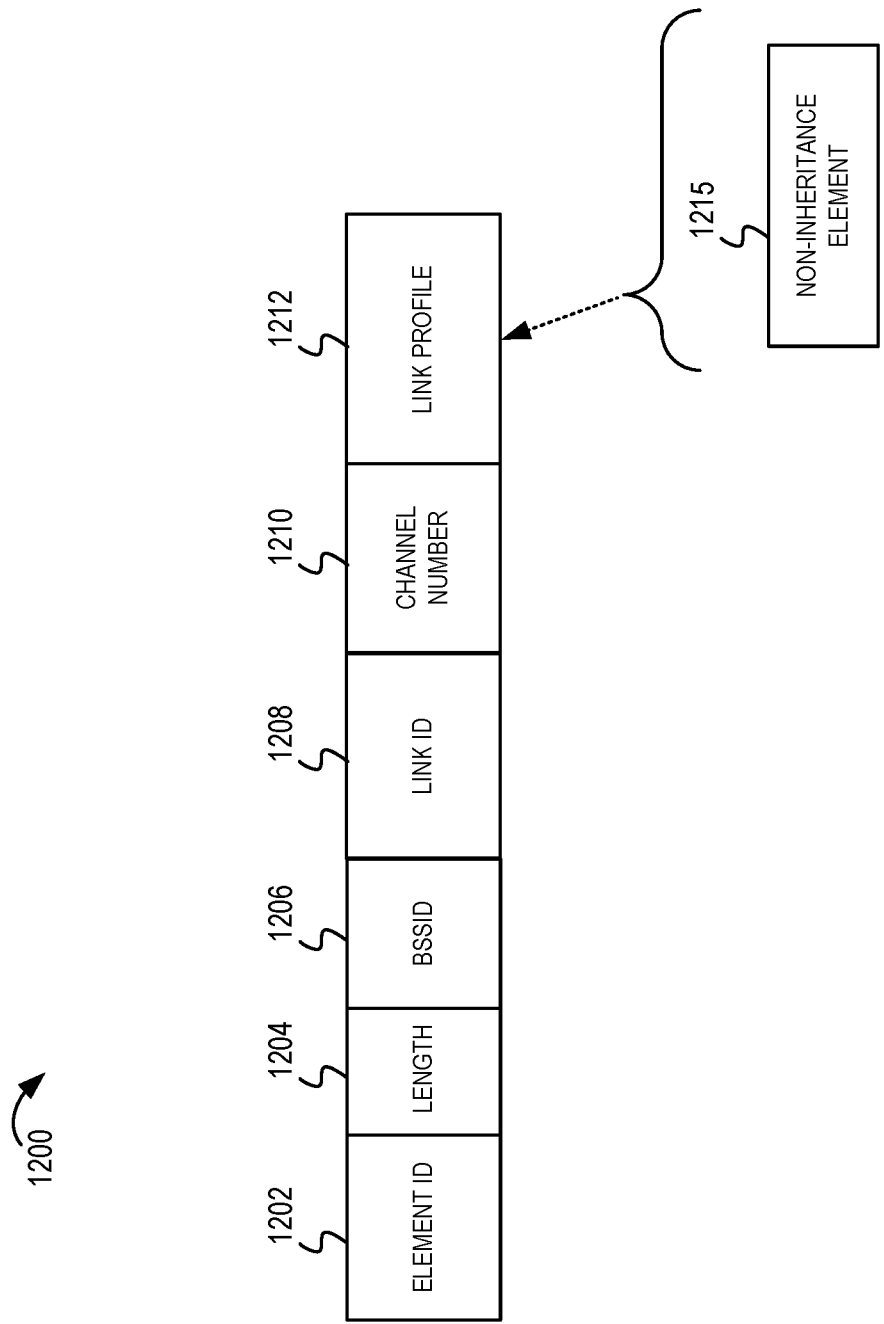
FIG. 12 depicts an example multi-link element included in a management frame associated with a first communication link for advertising inheritance information of a second communication link.

In some implementations, the management frame generated and transmitted by the first VAP 1151 via the first communication link 1112 may include a multi-link element (or other inheritance-related element) that may advertise the second communication link 1114 and provide inheritance (including non-inheritance) information regarding the second communication link 1114, as will be further described in FIG. 12. For example, the multi-link element may include a non-inheritance element (such as the non-inheritance element shown in FIG. 5) that specifies the management element or feature that are disabled for the second communication link 1114 (and override any inheritance settings for these management elements). In some implementations, the non-inheritance element may be a sub-element of the multi-link element, or the multi-link element may include a link profile for the second communication link 1114 (or other similar link-specific information) that includes the non-inheritance element, as described further in FIG. 12. The multi-link element also may include additional inheritance information that indicates the management elements that are inherited from the first communication link 1112, and the management elements that are customized for the second communication link 1114, either as sub-elements of the multi-link element or within the link profile of the multi-link element. In some implementations, the management elements that are not included in the multi-link element or the link profile are considered management elements that the second communication link 1114 inherits from the first communication link 1112. In some implementations, the conditional inheritance unit 1155 and the link management unit 1156 of the WLAN apparatus 1150 may prepare and configure the multi-link element, the link profile, and the non-inheritance element, and include this inheritance information and settings in the management frame. In some implementations, instead of including the multi-link element in the management frame (as shown in FIG. 12), the link profile and the non-inheritance element may be included in an existing management element or sub-element (for example, a management element or sub-element defined by the family of IEEE 802.11 wireless standards, such as IEEE 802.11ax or 802.11be EHT standard specifications), or an existing management element or sub-element may be repurposed. For example, the link profile and the non-inheritance element may be included in a multi-band element or in a capabilities element (such as an EHT capabilities element).

In some implementations, each of the STAs (such as STAs 1110 and 1120) may include a conditional inheritance unit to process the management frame received from the WLAN apparatus 1150 (such as a Beacon frame or a Probe Response frame). For example, as shown in FIG. 11, the first STA 1110 may include a conditional inheritance unit 1125. The second STA 1120 also may include a conditional inheritance unit; however, the conditional inheritance unit is not shown in FIG. 11 for simplicity. In some implementations, after receiving the management frame, the conditional inheritance unit 1125 of the first STA 1110 may process the management frame to determine which management elements are inherited and which are not inherited, for example. The conditional inheritance unit 1125 may parse and process some of the management elements related to inheritance (including non-inheritance) associated with the second communication link 1114 to determine which management elements are inherited from the first communication link 1112, which management elements are not inherited or disabled, and which management elements are customized for the second communication link 1114. In some implementations, the first STA 1110 may also determine whether it supports the second communication link 1114 based on the inheritance information included in the management frame, and the first STA 1110 may also determine whether or not to enable the second communication link 1114, as will be further described in FIG. 14. After processing the management frame, the first STA 1110 may communicate with the VAP 1151 of the WLAN apparatus 1150 at least in part to indicate whether to enable the second communication link 1114.

In some implementations, when the WLAN apparatus 1150 provides functions of the second VAP 1152 (optional) associated with a second BSS, the second VAP 1152 also may implement multi-link aggregation with a second STA 1120. For example, the second VAP 1152 may use a first communication link 1122 and a second communication link 1124 for communications with the second STA 1120 of the second BSS. Furthermore, the second VAP 1152 may perform both multi-link aggregation operations and conditional inheritance operations with the second STA 1120, similarly as described herein for the first VAP 1151 and the first STA 1110. In some implementations, the WLAN apparatus 1150 may remain backward compatible to legacy devices (such as devices that do not support multi-link aggregation) when performing multi-link aggregation. For example, a legacy device may receive a management frame via the first communication link 1112 using the first frequency band from the WLAN apparatus 1150 that implements multi-link aggregation, and the management frame may include management elements associated with the first communication link 1112 and inheritance information associated with the second communication link 1114. The legacy device may communication with the first VAP 1151 of the WLAN apparatus 1150 to establish an association via the first communication link 1112, and ignore the inheritance information associated with the second communication link 1114 (since the legacy device does not support multi-link aggregation or the multi-link element). After establishing a wireless association with the legacy device, the first VAP 1151 of the WLAN apparatus 1150 may communicate with the legacy device using only the first communication link 1112 for that particular association (and not the second communication link 114), since the legacy device does not support multi-link aggregation.

FIG. 12 depicts an example multi-link element 1200 included in a management frame associated with a first communication link for advertising inheritance information of a second communication link. In some implementations, the multi-link element 1200 may be used by an AP (such as the first VAP 1151 of the WLAN apparatus 1150 shown in FIG. 11) that implements multi-link aggregation to advertise inheritance information associated with a second communication link in a management frame transmitted via a first communication link (such as the first and second communication links 1112 and 1114 of FIG. 11).

In some implementations, a multi-link element (such as the multi-link element 1200) may be transmitted periodically in beacon frames or may be transmitted at any time via other management frames (such as probe response or (re) association response frames). As shown in FIG. 12, the multi-link element 1200 may include an element ID 1202, a length 1204, a BSSID 1206, a link ID 1208, a channel number 1210, and a link profile 1212. The link profile 1212 may include a non-inheritance element 1215. In some implementations, the multi-link element 120 may include two or more link profiles if the AP supports multi-link aggregation with three or more communication links. In some implementations, the multi-link element 1200 may include additional fields or subfields, which are not shown in FIG. 12 for simplicity. In some implementations, the multi-link element 1200 may include different fields or fewer fields than the fields shown in FIG. 12. The element ID 1202, the length 1204, the BSSID 1206, and the channel number 1210 may be defined according to general procedures (for example, as defined by the family of IEEE 802.11 wireless standards). For example, the element ID 1202 and the length 1204 may be the element ID and length defined in existing or future IEEE 802.11 standards. The BSSID 1206 may be the BSSID of the BSS associated with the AP, and the channel number 1210 may be the channel number (which also may correspond to the frequency band) associated with the BSS.

In some implementations, the VAP 1151 may generate and transmit a management frame via the first communication link 1112 that includes the multi-link element 1200 to advertise inheritance (including non-inheritance) information associated with the second communication link 1114. As described above, the non-inheritance element 1215 may indicate the management elements associated with the first communication link 1112 that are disabled (or not inherited) for the second communication link 1114. In some implementations, the non-inheritance element 1215 may have the same (or a similar) structure and information as the non-inheritance element 500 shown in FIG. 5. In some implementations, the non-inheritance element 1215 may be part of the link profile 1212. The link profile 1212 also may list the management elements of the first communication link 1112 that are customized for the second communication link 1114 (such as channel or band specific elements). In some implementations, the management elements of the first communication link 1112 that are not listed in the link profile 1212 or in the non-inheritance element 1215 are inherited (without any changes or customization) from the first communication link 1112 by the second communication link 1114.

Figure 13:
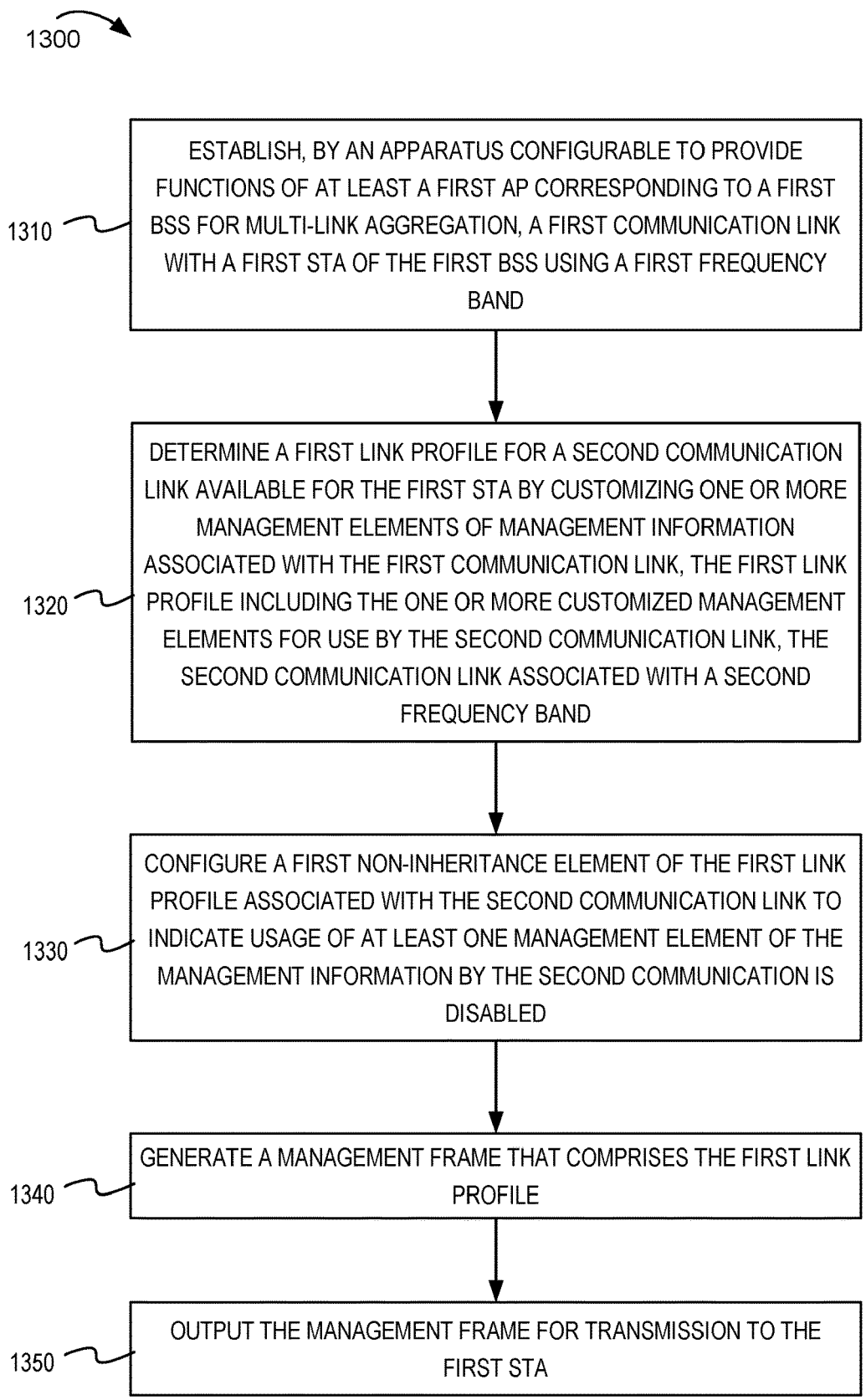
FIG. 13 shows an example flowchart of an apparatus implementing conditional inheritance for multi-link aggregation.

FIG. 13 shows an example flowchart 1300 of an apparatus implementing conditional inheritance for multi-link aggregation. The apparatus may be a WLAN apparatus that is configurable to provide functions of an AP corresponding to a first BSS for multi-link aggregation.

At block 1310, the apparatus may establish a first communication link with a first STA of the first BSS using a first frequency band. For example, the first frequency band may be a 2.4 GHz, 5 GHz, 6 GHz, or 60 GHz frequency band.

At block 1320, the apparatus may determine a first link profile for a second communication link available for the first STA by customizing one or more management elements of management information associated with the first communication link. The first link profile may include the one or more customized management elements for use by the second communication link. The second communication link may use a second frequency band that is different than the first frequency band. For example, if the first frequency band is the 2.4 GHz frequency band, the second frequency band may be the 5 GHz frequency band. In some implementations, the first communication link may be an anchor communication link for establishing a wireless association with the first STA, and the second communication link is a candidate communication link for the first STA for implementing the multi-link aggregation.

At block 1330, the apparatus may configure a first non-inheritance element of the first link profile associated with the second communication link to indicate usage of at least one management element of the management information by the second communication link is disabled. In some implementations, the apparatus may configure the first non-inheritance element of the first link profile by listing information associated with the at least one management element in the first non-inheritance element. For example, the non-inheritance element of the first link profile may list one or more management elements that will be disabled (or not be inherited) for the second communication link. In some implementations, the first non-inheritance element may list an element ID associated with the at least one management element in a list of element IDs field of the first non-inheritance element, and an element ID extension associated with the at least one management element in a list of element ID extensions field of the first non-inheritance element.

In some implementations, the apparatus may determine a second link profile for a third communication link available for the first STA by customizing one or more management elements of the management information associated with the first communication link. The second link profile may include one or more customized management elements for use by the third communication link. The third communication link may use a third frequency band that is different from the first and second frequency bands. In some implementations, the apparatus may configure a second non-inheritance element of the second link profile associated with the third communication link to indicate usage of at least one management element of the management information by the third communication link is disabled.

At block 1340, the apparatus may generate a management frame that includes the first link profile. The first link profile may include the first non-inheritance element. In some implementations, the management frame also may include the second link profile having a second non-inheritance element.

At block 1350, the apparatus may output the management frame for transmission to the first STA. In some implementations, the management frame may be a beacon frame, a probe response frame, an association response frame, or a re-association response frame, and the management information may include one or more of management elements, fields, features, and capabilities. In some implementations, the apparatus may determine to establish the second communication link in response to receiving a communication from the first STA indicating the first STA supports establishing the second communication link based, at least in part, on the first link profile. For example, the first STA may indicate that it supports the one or more customized management elements and the non-inheritance element (associated with the second communication link) that were included in the management frame received by the first STA. The apparatus and the first STA may then establish the second communication link and begin multi-link aggregation operations. The first STA also may indicate to the apparatus that it does not support the second communication link based on the inheritance information that was included in the management frame. Further, in some cases, the first STA also may indicate to the apparatus to not enable the second communication link because the first STA does not have sufficient active traffic to expand out to an additional link.

Figure 14:
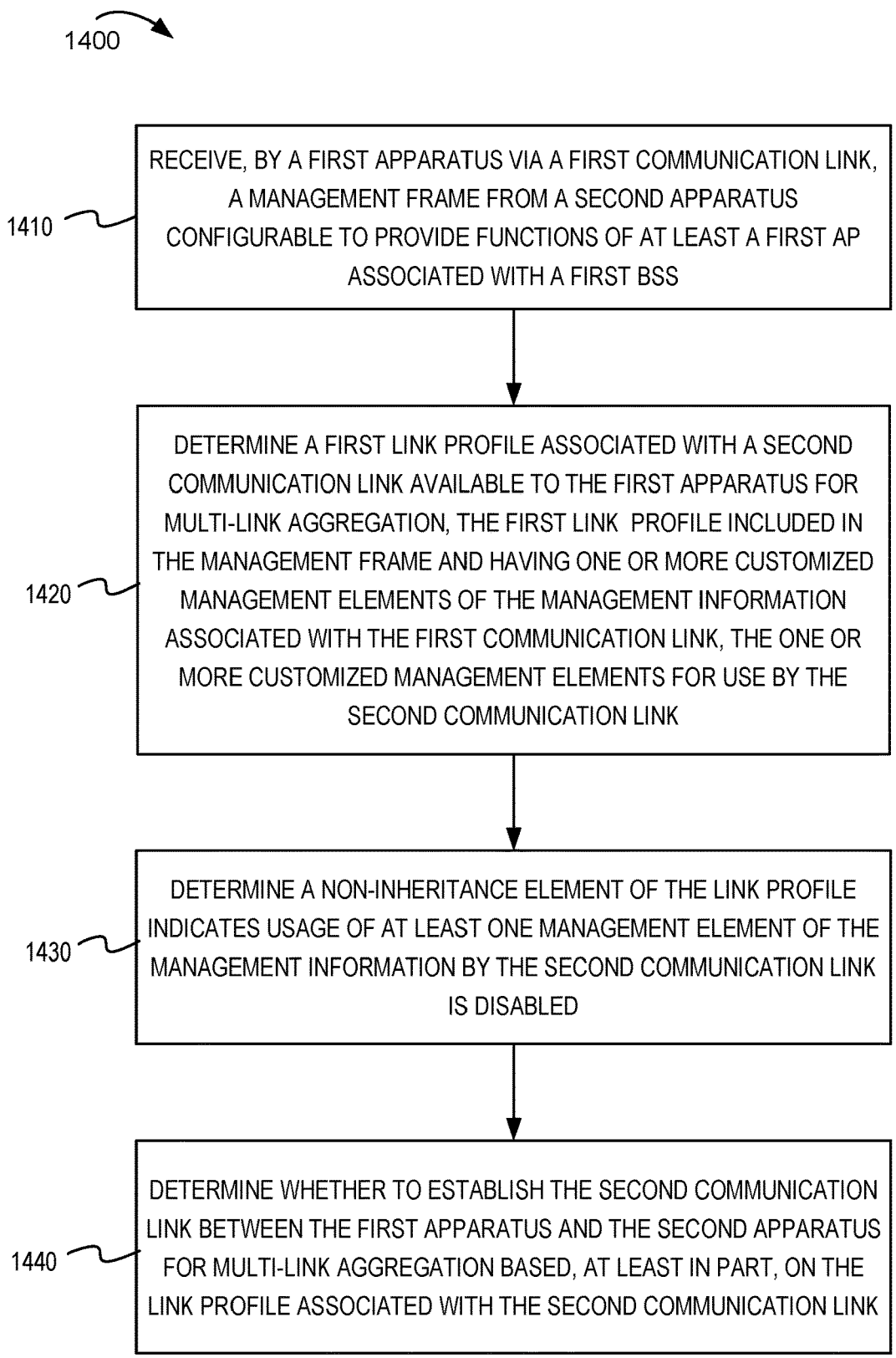
FIG. 14 shows an example flowchart of a first apparatus receiving a management frame having conditional inheritance information for multi-link aggregation.

FIG. 14 shows an example flowchart 1400 of a first apparatus receiving a management frame having conditional inheritance information for multi-link aggregation. The first apparatus may be a STA that is configurable to implement conditional inheritance and multi-link aggregation function. The first apparatus may receive the management frame from a second apparatus, which may be configurable to provide functions of an AP corresponding to a first BSS for multi-link aggregation.

At block 1410, the first apparatus may receive, via a first communication link, a management frame from a second apparatus configurable to provide functions of at least a first AP associated with a first BSS. The first communication link may use a first frequency band. For example, the first frequency band may be a 2.4 GHz, 5 GHz, 6 GHz, or 60 GHz frequency band.

At block 1420, the first apparatus may determine a link profile associated with a second communication link that is available to the first apparatus for multi-link aggregation. The link profile may be included in the received management frame. The link profile may include one or more customized management elements of the management information associated with the first communication link for use by the second communication link. The second communication link may use a second frequency band that is different than the first frequency band. For example, if the first frequency band is the 5 GHz frequency band, the second frequency band may be the 6 GHz frequency band. In some implementations, the first communication link may be an anchor communication link for establishing a wireless association between the first apparatus and the second apparatus. The second communication link may be a candidate communication link for the first STA for implementing the multi-link aggregation.

At block 1430, the first apparatus may determine a first non-inheritance element of the first link profile indicates usage of at least one management element of the management information by the second communication link is disabled.

In some implementations, the first apparatus may determine a second link profile for a third communication link that is available to the first apparatus for multi-link aggregation. The second link profile may include one or more customized management elements for use by the third communication link. The third communication link may use a third frequency band that is different from the first and second frequency bands. In some implementations, the apparatus may determine a second non-inheritance element of the second link profile associated with the third communication link indicates usage of at least one management element of the management information by the third communication link is disabled.

At block 1440, the first apparatus may determine whether to establish the second communication link between the first apparatus and the second apparatus for multi-link aggregation based, at least in part, on the link profile associated with the second communication link. In some implementations, the first apparatus may receive the management frame including the link profile and determine it supports the one or more customized management elements and the non-inheritance element included in the link profile associated with the second communication link. The first apparatus may approve establishing the second communication link in response to determining the first apparatus supports the one or more customized management elements and the non-inheritance element. The first apparatus may communicate with the second apparatus to indicate the first apparatus supports establishing the second communication link in response to determining the first apparatus supports the one or more customized management elements and the non-inheritance element. The first apparatus and the second apparatus may then exchange communications or other signaling to establish the second communication link. If the first apparatus does not support the inheritance information that was included in the management frame, the first apparatus may communicate with the second apparatus to indicate the first apparatus does not support enabling the second communication link. Furthermore, in some cases, the first apparatus may perform a dynamic expansion or contraction of the number of communication links that are enabled based on the amount of active traffic and the optional number of communication links that are needed to support the active traffic. For example, the first apparatus may determine it does not have sufficient active links for expanding out to a second communication link. Thus, the first apparatus may communicate with the second apparatus to indicate not to enable the second communication link, or if the second communication link is enabled, to indicate that the first apparatus will disable the second communication link. The first apparatus may periodically and dynamically enable or disable the additional communication links as needed.

Figure 15:
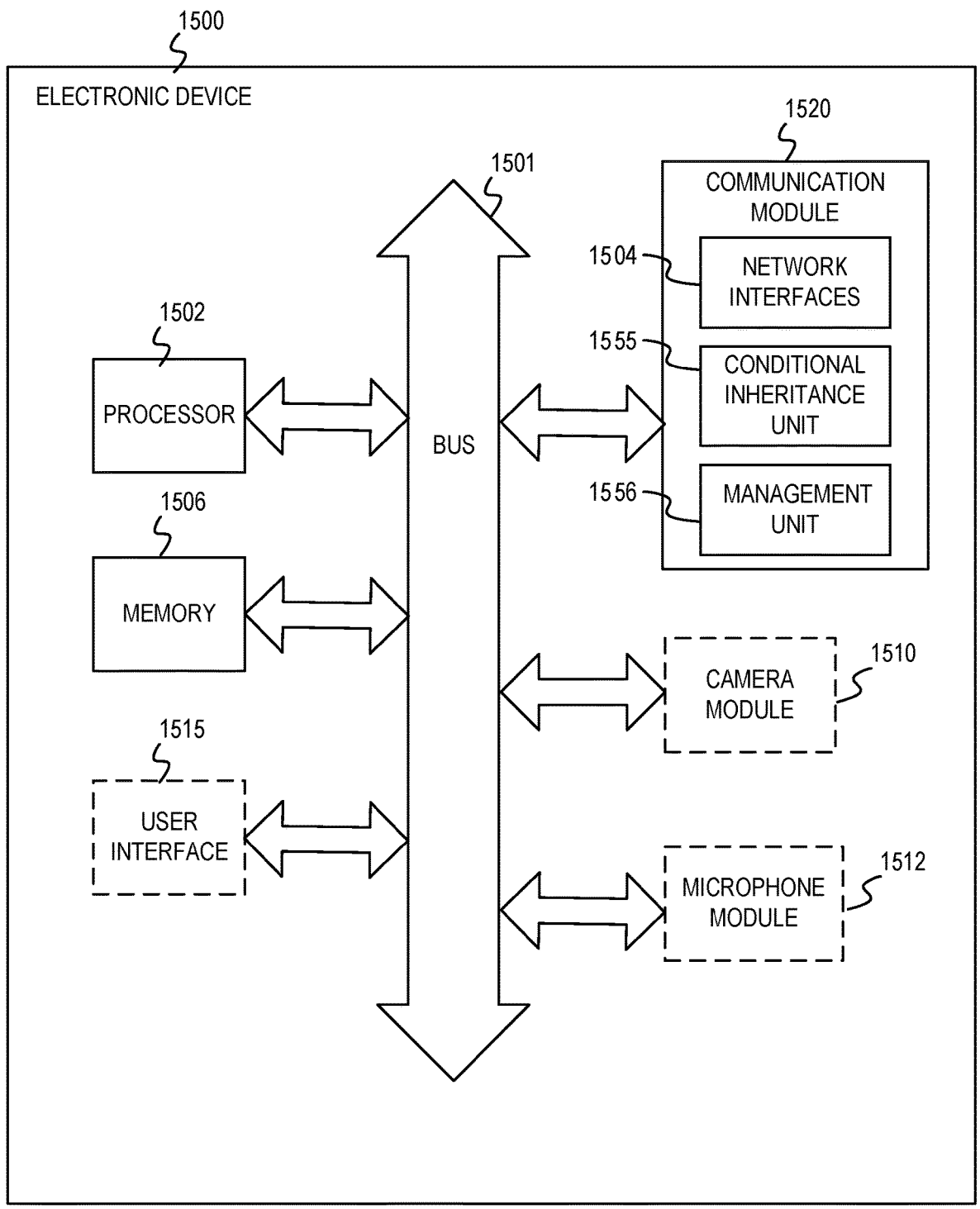
FIG. 15 shows a block diagram of an example electronic device for implementing aspects of this disclosure.

FIG. 15 shows a block diagram of an example electronic device 1500 for implementing aspects of this disclosure. In some implementations, the electronic device 1500 may be representative of the WLAN apparatus or the STAs shown in FIGS. 1, 7, and 11. The electronic device 1500 may be a laptop computer, a tablet computer, a mobile phone, a gaming console, a smartwatch, a wearable device, an access point, a network router, a range extender, a smart appliance, or another electronic system. The electronic device 1500 includes a processor 1502 (possibly including multiple processors, multiple cores, multiple nodes, or implementing multi-threading, etc.). The electronic device 1500 includes a memory 1506. The memory 1506 may be system memory or any one or more of the below-described possible realizations of a machine-readable medium or computer-readable medium. The electronic device 1500 also may include a bus 1501 (such as PCI, ISA, PCI-Express, HyperTransport®, InfiniBand®, NuBus, AHB, AXI, etc.). The electronic device 1500 may include one or more network interfaces 1504, that can include at least one of a wireless network interface (such as a WLAN interface, a Bluetooth® interface, an LTE interface, a WiMAX® interface, a ZigBee® interface, a Wireless USB interface, etc.) and a wired network interface (such as an Ethernet interface, a powerline communication interface, etc.). In some implementations, the electronic device 1500 may support one or more network interfaces 1504, each of which may be configured to couple the electronic device 1500 to a different communication network.

The electronic device 1500 may include a communication module 1520. In some implementations, the communication module 1520 may include the one or more network interfaces 1504. In some implementations, the one or more network interfaces 1504 may be representative of the one or more modems, one or more antennas, analog front end (AFE), and other communication-related components of the electronic device 1500. In some implementations, the communication module 1520 may include the conditional inheritance unit 1555 and the management unit 1556. The conditional inheritance unit 1555 may implement the various conditional inheritance operations and techniques for a multiple BSSID set, as described in FIGS. 1-6 and 9-10. The management unit 1556 may manage the multiple BSSID capabilities for the electronic device 1500, obtain the conditional inheritance settings determined by the conditional inheritance unit 1555, and generate the management frame for the multiple BSSIDs based on the conditional inheritance settings, as described in FIGS. 1-6 and 9-10. In some implementations, the conditional inheritance unit 1555 and the management unit 1556 may implement the various conditional inheritance operations and techniques for co-located VAPs, as described in FIGS. 7-10. In some implementations, the conditional inheritance unit 1555 and the management unit 1556 may implement the various conditional inheritance operations for multi-link aggregation, as described in FIGS. 11-14.

The memory 1506 includes functionality to support various implementations. The memory 1506 can include computer instructions executable by the processor 1502 to implement the functionality of the implementations described in FIGS. 1-14. For example, the memory 1506 may include one or more functionalities that facilitate implementation of the conditional inheritance techniques described in FIGS. 1-14. In some implementations, the communication module 1520 may perform some or all of the operations described herein. For example, the communication module 1520 may include an additional processor (such as a baseband processor) and additional memory that may include computer instructions executable by the additional processor to implement some or all of the functionality of the implementations described in FIGS. 1-14. In some implementations, the additional processor(s) and memory of the communication module 1520, the processor 1502 and the memory 1506, or a combination of some or all of these components can implement the conditional inheritance unit 1555 and the management unit 1556 described in FIGS. 1, 7, and 11. In some implementations, the electronic device 1500 also may include additional components, such as a camera module 1510, a microphone module 1512, a user interface 1515, and other input/output components. For example, if the electronic device 1500 is a STA or is a device that is operating as an AP (such as a software enabled AP or "SoftAP"), the STA may include the camera module 1510, the microphone module 1512, and the user interface 1515. A dedicated or stand-alone AP may include some version of the user interface 1515, but may not include the camera module 1510 or the microphone module 1512.

Any one of these functionalities may be partially (or entirely) implemented in hardware or on the processor 1502. For example, the functionality may be implemented with an application specific integrated circuit, in logic implemented in the processor 1502, in a co-processor on a peripheral device or card, etc. Further, realizations may include fewer or additional components not illustrated in FIG. 15 (such as video cards, audio cards, additional network interfaces, peripheral devices, etc.). The processor 1502, the memory 1506, and the communication module 1520 may be coupled to the bus 1501. Although illustrated as being coupled to the bus 1501, the memory 1506 may be directly coupled to the processor 1502. Furthermore, although illustrated as being within to the communication module 1520, in some implementations the network interfaces 1504 may be a separate module that is directly coupled to the bus 1501.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include cache memory, RAM (including SRAM, DRAM, zero capacitor RAM, Twin Transistor RAM, eDRAM, EDO RAM, DDR RAM, EEPROM, NRAM, RRAM, SONOS, PRAM, or the like), ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray' disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for multi-link communication in a wireless local area network (WLAN), comprising:
    establishing multi-link communication between a first WLAN apparatus and a second WLAN apparatus, the multi-link communication including a first communication link and a second communication link; and
    transmitting a management frame from the first WLAN apparatus to the second WLAN apparatus, wherein the management frame includes management elements associated with the first communication link and a link profile associated with the second communication link, wherein the link profile includes a non-inheritance element indicating which management elements associated with the first communication link are not inherited for the second communication link.

2. The method of claim 1, wherein the link profile further includes one or more management elements for the second communication link that differ from corresponding ones of the management elements associated with the first communication link.

3. The method of claim 1, wherein the first communication link and the second communication link are associated with different frequency bands or different channels.

4. The method of claim 1, further comprising:
    receiving a communication from the second WLAN apparatus requesting establishment of the second communication link associated with the link profile; and
    establishing the second communication link for the multi-link communication in response to the communication.

5. The method of claim 4, wherein the second communication link is dynamically enabled or disabled by the first WLAN apparatus or the second WLAN apparatus in association with an amount of active traffic between the first WLAN apparatus and the second WLAN apparatus.

6. The method of claim 4, wherein the second communication link is established without performing a separate wireless association process between the first WLAN apparatus and the second WLAN apparatus for the second communication link.

7. The method of claim 1, wherein the management elements associated with the first communication link that are not indicated in the non-inheritance element are inherited for the second communication link unless the link profile includes a corresponding management element specific to the second communication link.

8. The method of claim 1, wherein the non-inheritance element includes a list of those management elements associated with the first communication link that are not inherited for the second communication link.

9. The method of claim 1, wherein the non-inheritance element includes a list of element identifications (IDs) to identify which ones of the element IDs in the management elements associated with the first communication link are not inherited for the second communication link.

10. The method of claim 1, wherein the management frame is a beacon frame, a probe response frame, an association response frame, or a re-association response frame.

11. A method for multi-link communication in a wireless local area network (WLAN), comprising:
    establishing a first communication link between a first WLAN apparatus and a second WLAN apparatus;
    receiving, via the first communication link, a management frame from an access point (AP) of the second WLAN apparatus, wherein the management frame includes management elements associated with the first communication link and a link profile associated with a second communication link available for the multi-link communication, wherein the link profile includes a non-inheritance element indicating which management elements associated with the first communication link are not inherited for the second communication link; and
    establishing the second communication link using the link profile, wherein the first communication link and the second communication link enable the multi-link communication between the first WLAN apparatus and the second WLAN apparatus.

12. The method of claim 11, wherein the link profile further includes one or more management elements for the second communication link that differ from corresponding ones of the management elements associated with the first communication link.

13. The method of claim 11, further comprising:
    communicating a request to the second WLAN apparatus to indicate the first WLAN apparatus supports establishing the second communication link; and
    receiving the management frame in response to the request.

14. The method of claim 11, further comprising dynamically enabling or disabling the second communication link in association with an amount of active traffic between the first WLAN apparatus and the second WLAN apparatus.

15. The method of claim 11, wherein the management frame is a beacon frame, a probe response frame, an association response frame, or a re-association response frame, and wherein the non-inheritance element of the link profile includes a list of element identifications (IDs) to identify which ones of the element IDs in the management elements associated with the first communication link are not inherited for the second communication link.

16. A first wireless local area network (WLAN) apparatus for wireless communication, the first WLAN apparatus comprising:
    a processor configured to manage multi-link communication between the first WLAN apparatus and a second WLAN apparatus, the multi-link communication associated with a first communication link and a second communication link; and
    a communication unit configured to output a management frame for transmission from the first WLAN apparatus to the second WLAN apparatus via the first communication link, wherein the management frame includes management elements associated with the first communication link and a link profile associated with the second communication link, wherein the link profile includes a non-inheritance element indicating which management elements associated with the first communication link are not inherited for the second communication link.

17. The first WLAN apparatus of claim 16, wherein the link profile further includes one or more management elements for the second communication link that differ from corresponding ones of the management elements associated with the first communication link.

18. The first WLAN apparatus of claim 16, wherein the management elements associated with the first communication link that are not indicated in the non-inheritance element are inherited for the second communication link unless the link profile includes a corresponding management element specific to the second communication link.

19. The first WLAN apparatus of claim 16, wherein the non-inheritance element includes a list of element identifications (IDs) to identify which ones of the element IDs in the management elements associated with the first communication link are not inherited for the second communication link.

20. A method for multi-link communication in a wireless local area network (WLAN), comprising:
  receiving, by a first WLAN apparatus, a probe request frame from a second WLAN apparatus; and
  transmitting a probe response frame in response to the probe request frame, wherein the probe response frame includes management elements associated with a first communication link and a multi-link element carrying a profile associated with a second communication link, and wherein the profile includes a non-inheritance element indicating which management elements associated with the first communication link are not inherited for the second communication link.

21. The method of claim 20, wherein the profile further includes one or more management elements for the second communication link that differ from corresponding ones of the management elements associated with the first communication link.

22. The method of claim 20, further comprising:
  establishing a wireless association between the first WLAN apparatus and the second WLAN apparatus, wherein the wireless association enables multi-link communication via the first communication link and the second communication link.

23. A first wireless local area network (WLAN) apparatus for wireless communication, the first WLAN apparatus comprising:
  a processor configured to establish a first communication link between a first WLAN apparatus and a second WLAN apparatus;
  a communication unit configured to receive, via the first communication link, a management frame from an access point (AP) of the second WLAN apparatus, wherein the management frame includes management elements associated with the first communication link and a link profile associated with a second communication link available for the multi-link communication, wherein the link profile includes a non-inheritance element indicating which management elements associated with the first communication link are not inherited for the second communication link; and
  the processor further configured to establish the second communication link using the link profile, wherein the first communication link and the second communication link enable the multi-link communication between the first WLAN apparatus and the second WLAN apparatus.

24. The first WLAN apparatus of claim 23, wherein the link profile further includes one or more management elements for the second communication link that differ from corresponding ones of the management elements associated with the first communication link.

25. The first WLAN apparatus of claim 23, wherein the communication unit is further configured to:
  communicate a request to the second WLAN apparatus to indicate the first WLAN apparatus supports establishing the second communication link; and
  receive the management frame in response to the request.

26. The first WLAN apparatus of claim 23, wherein the processor is further configured to dynamically enable or disable the second communication link in association with an amount of active traffic between the first WLAN apparatus and the second WLAN apparatus.

27. The first WLAN apparatus of claim 23, wherein the management frame is a beacon frame, a probe response frame, an association response frame, or a re-association response frame, and wherein the non-inheritance element of the link profile includes a list of element identifications (IDs) to identify which ones of the element IDs in the management elements associated with the first communication link are not inherited for the second communication link.

28. A first wireless local area network (WLAN) apparatus for wireless communication, the first WLAN apparatus comprising:
  a communication unit configured to:
    receive a probe request frame from a second WLAN apparatus; and
    transmit a probe response frame in response to the probe request frame, wherein the probe response frame includes management elements associated with a first communication link and a multi-link element carrying a profile associated with a second communication link, and wherein the profile includes a non-inheritance element indicating which management elements associated with the first communication link are not inherited for the second communication link.

29. The first WLAN apparatus of claim 28, wherein the profile further includes one or more management elements for the second communication link that differ from corresponding ones of the management elements associated with the first communication link.

30. The first WLAN apparatus of claim 28, further comprising:
  a processor configured to establish a wireless association between the first WLAN apparatus and the second WLAN apparatus, wherein the wireless association enables multi-link communication via the first communication link and the second communication link.

* * * * *

UNITED STATES PATENT AND TRADEMARK OFFICE
CERTIFICATE OF CORRECTION

PATENT NO.         : 12,289,201 B2
APPLICATION NO.    : 17/735067
DATED              : April 29, 2025
INVENTOR(S)        : Xiao et al.

It is certified that error appears in the above-identified patent and that said Letters Patent is hereby corrected as shown below:

In the Claims

Claim 1, Column 39, Line 7 should read:
"establishing the multi-link communication between a first"

Claim 22, Column 41, Line 28 should read:
"wherein the wireless association enables the multi-link"

Claim 23, Column 41, Line 35 should read:
"link between the first WLAN apparatus and a second"

Claim 23, Column 41, Line 43 should read:
"link available for multi-link communication"

Signed and Sealed this
First Day of July, 2025

Coke Morgan Stewart
*Acting Director of the United States Patent and Trademark Office*